(12) United States Patent
Wang et al.

(10) Patent No.: US 8,274,631 B2
(45) Date of Patent: *Sep. 25, 2012

(54) CONTROLLING POLARIZATION FOR LIQUID CRYSTAL DISPLAYS

(76) Inventors: Ran-Hong Raymond Wang, Irvine, CA (US); Min-Shine Chow Wang, Irvine, CA (US)

(*) Notice: Subject to any disclaimer, the term of this patent is extended or adjusted under 35 U.S.C. 154(b) by 1392 days.

This patent is subject to a terminal disclaimer.

(21) Appl. No.: 11/298,755

(22) Filed: Dec. 9, 2005

(65) Prior Publication Data

US 2006/0262255 A1 Nov. 23, 2006

Related U.S. Application Data

(63) Continuation-in-part of application No. 11/135,609, filed on May 23, 2005, now Pat. No. 7,633,583.

(51) Int. Cl.
*G02F 1/1335* (2006.01)
(52) U.S. Cl. .......................................... 349/137; 349/12
(58) Field of Classification Search .................. 349/114, 349/119, 12, 15, 137
See application file for complete search history.

(56) References Cited

U.S. PATENT DOCUMENTS

| | | |
|---|---|---|
| 4,756,953 A | 7/1988 | Utsumi |
| 4,764,840 A | 8/1988 | Petrie et al. |
| 5,694,191 A | 12/1997 | Strathman et al. |
| 5,759,643 A | 6/1998 | Miyashita et al. |
| 5,986,737 A | 11/1999 | Evanicky et al. |
| 6,025,897 A | 2/2000 | Weber et al. |
| 6,080,467 A | 6/2000 | Weber et al. |
| 6,111,697 A | 8/2000 | Merrill et al. |
| 6,124,905 A | 9/2000 | Iijima |
| 6,129,980 A | 10/2000 | Tsukada et al. |
| 6,181,394 B1 | 1/2001 | Sanelle et al. |
| 6,184,969 B1 | 2/2001 | Fergason |
| 6,262,842 B1 | 7/2001 | Ouderkirk et al. |
| 6,285,425 B1 | 9/2001 | Akins et al. |
| 6,392,727 B1 | 5/2002 | Larson et al. |
| 6,396,630 B1 | 5/2002 | Stiens et al. |
| 6,411,344 B2 | 6/2002 | Fujii |
| 6,456,346 B1 | 9/2002 | Arai |
| 6,512,512 B1 | 1/2003 | Blanchard |
| 6,559,834 B1 | 5/2003 | Murakami |
| 6,572,941 B1 | 6/2003 | Murakami et al. |
| 6,611,299 B1 | 8/2003 | Fujii et al. |
| 6,717,641 B2 | 4/2004 | Arai |

(Continued)

FOREIGN PATENT DOCUMENTS

EP 1 189 097 3/2002

(Continued)

OTHER PUBLICATIONS

Preliminary Amendment, dated Aug. 18, 2003, for U.S. Appl. No. 10/370,360.

(Continued)

*Primary Examiner* — James Dudek
(74) *Attorney, Agent, or Firm* — Knobbe, Martens, Olson & Bear, LLP

(57) ABSTRACT

Certain embodiments of liquid crystal displays and liquid crystal display functional parts have low reflection for outdoor applications. Various embodiments also have the advantage of being able to provide increased contrast and brightness for certain convenient viewing directions for outdoor viewers wearing polarized sunglasses.

42 Claims, 17 Drawing Sheets

U.S. PATENT DOCUMENTS

| | | | |
|---|---|---|---|
| 6,738,115 B1 | 5/2004 | Iijima | |
| 6,747,720 B2 | 6/2004 | Saiki et al. | |
| 6,771,327 B2 * | 8/2004 | Sekiguchi | 349/12 |
| 6,906,767 B1 | 6/2005 | Iijima | |
| 6,909,486 B2 | 6/2005 | Wang et al. | |
| 6,961,108 B2 | 11/2005 | Wang et al. | |
| 6,972,813 B1 | 12/2005 | Toyooka | |
| 7,071,925 B2 | 7/2006 | Matsuda et al. | |
| 7,372,510 B2 | 5/2008 | Abileah | |
| 7,633,583 B2 | 12/2009 | Wang et al. | |
| 2001/0022997 A1 | 9/2001 | Honda et al. | |
| 2003/0001987 A1 | 1/2003 | Trapani et al. | |
| 2003/0020856 A1 | 1/2003 | Furuhashi et al. | |
| 2005/0018106 A1 | 1/2005 | Wang et al. | |
| 2007/0008471 A1 | 1/2007 | Wang et al. | |
| 2007/0279556 A1 | 12/2007 | Wang et al. | |
| 2011/0205471 A1 | 8/2011 | Wang et al. | |

FOREIGN PATENT DOCUMENTS

| | | |
|---|---|---|
| EP | 1 450 202 A2 | 8/2004 |
| EP | 1 450 202 A3 | 8/2004 |
| WO | WO 97/01788 | 1/1997 |
| WO | WO 01/79923 | 10/2001 |

OTHER PUBLICATIONS

Notice of Withdrawal of the Aug. 20, 2003 Preliminary Amendment, dated Nov. 12, 2003, for U.S. Appl. No. 10/370,360.
Office Action and Restriction Requirement mailed Jan. 29, 2008 for U.S. Appl. No. 11/135,609.
Response to Restriction Requirement, dated Feb. 29, 2008, for U.S. Appl. No. 11/135,609.
Preliminary Amendment, dated Mar. 26, 2008, for U.S. Appl. No. 11/135,609.
Office Action mailed May 22, 2008 for U.S. Appl. No. 11/135,609.
Response to Office Action Dated May 22, 2008, dated Aug. 5, 2008, for U.S. Appl. No. 11/135,609.
Office Action mailed Nov. 19, 2008 for U.S. Appl. No. 11/135,609.
Request for Continued Examination, dated Dec. 29, 2008, for U.S. Appl. No. 11/135,609.
Office Action mailed Jan. 26, 2009 for U.S. Appl. No. 11/135,609.
Response to Office Action Dated Jan. 26, 2009, dated Feb. 19, 2009, for U.S. Appl. No. 11/135,609.
Office Action dated Mar. 25, 2009 for U.S. Appl. No. 11/135,609.
Request for Continued Examination, dated May 4, 2009, for U.S. Appl. No. 11/135,609.
Notice of Allowance mailed May 18, 2009 for U.S. Appl. No. 11/135,609.
Request for Continued Examination, dated Jul. 9, 2009, for U.S. Appl. No. 11/135,609.
Notice of Allowance mailed Jul. 27, 2009 for U.S. Appl. No. 11/135,609.
Office Action mailed Jun. 17, 2004 for U.S. Appl. No. 10/370,360.
Response to Office Action and Notification of Filing of Divisional Application, dated Jul. 16, 2004, for U.S. Appl. No. 10/370,360.
Office Action mailed Aug. 16, 2004 for U.S. Appl. No. 10/370,360.
Amendments and Response to Office Action, dated Nov. 3, 2004 for U.S. Appl. No. 10/370,360.
Notice of Allowance dated Feb. 18, 2005 for U.S. Appl. No. 10/370,360.
Office Action mailed Jan. 30, 2006 for U.S. Appl. No. 10/900,565.
Amendment and Response to Office Action, dated Apr. 27, 2006, for U.S. Appl. No. 10/900,565.
Office Action mailed Jul. 11, 2006 for U.S. Appl. No. 10/900,565.
Amendment and Response to Restriction Requirement mailed Jul. 11, 2006, dated Nov. 13, 2006, for U.S. Appl. No. 10/900,565.
Office Action mailed Feb. 6, 2007 for U.S. Appl. No. 10/900,565.
Amendment and Response to Office Action Dated Feb. 6, 2007, dated Aug. 3, 2007, for U.S. Appl. No. 10/900,565.
Notice of Allowance dated Sep. 14, 2007 for U.S. Appl. No. 10/900,565.
Request for Continued Examination, dated Dec. 14, 2007, for U.S. Appl. No. 10/900,565.
Notice of Allowance dated Jan. 22, 2008 for U.S. Appl. No. 10/900,565.
Request for Continued Examination, dated Apr. 21, 2008, for U.S. Appl. No. 10/900,565.
Office Action dated May 13, 2008, for U.S. Appl. No. 10/900,565.
Office Action mailed Mar. 30, 2009 for U.S. Appl. No. 11/438,905.
Amendment and Response mailed Sep. 30, 2009 for U.S. Appl. No. 11/438,905.
Office Action mailed Feb. 18, 2010 for U.S. Appl. No. 11/438,905.
Preliminary Amendment mailed Nov. 3, 2009 for U.S. Appl. No. 11/842,017.
Office Action dated Dec. 14, 2004 in U.S. Appl. No. 10/892,867.
Response to Office Action, dated May 26, 2005, in U.S. Appl. No. 10/892,867.
Notice of Allowance dated Jun. 27, 2005 in U.S. Appl. No. 10/892,867.
Interview Summary in U.S. Appl. No. 11/438,905, mailed Jun. 29, 2010.
RCE and Amendment in U.S. Appl. No. 11/438,905, dated Aug. 17, 2010.
Office Action in U.S. Appl. No. 11/842,017, mailed Jul. 9, 2010.
Notice of Abandonment in U.S. Appl. No. 12/632,509, mailed Sep. 3, 2010.
Notice of Abandonment in U.S. Appl. No. 11/842,017, mailed Feb. 17, 2011.
Office Action in U.S. Appl. No. 13/098,355 mailed Jun. 4, 2012.

* cited by examiner

FIG. 1A
FIG. 1B
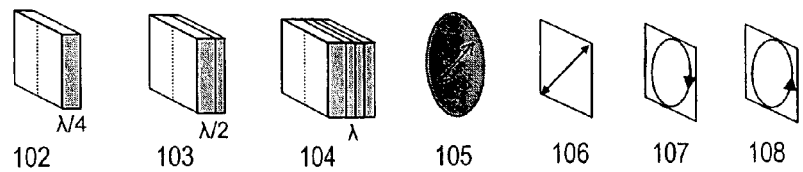
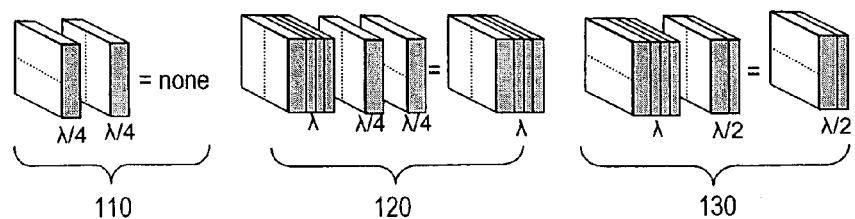
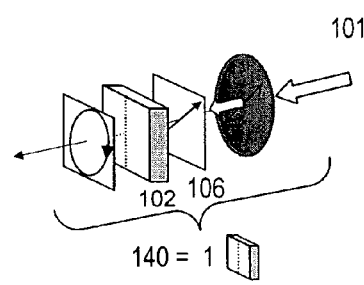
FIG. 1C
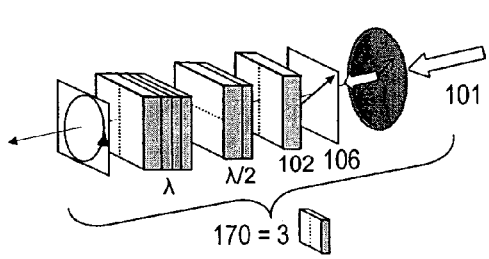
FIG. 1F
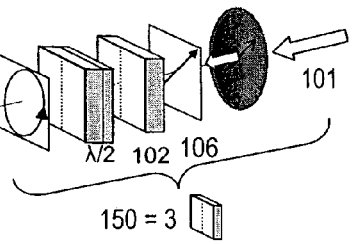
FIG. 1D
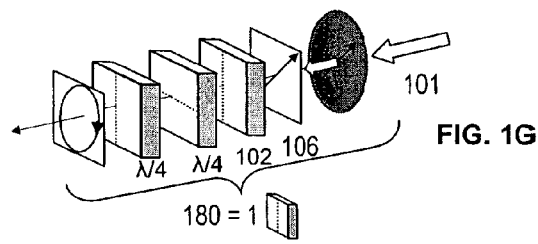
FIG. 1G
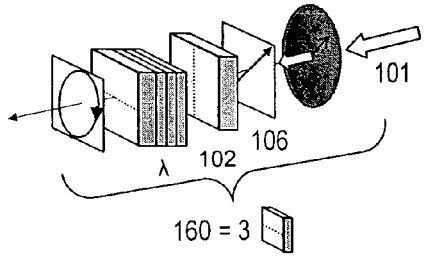
FIG. 1E
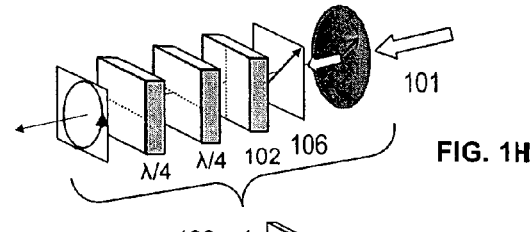
FIG. 1H
FIG. 1

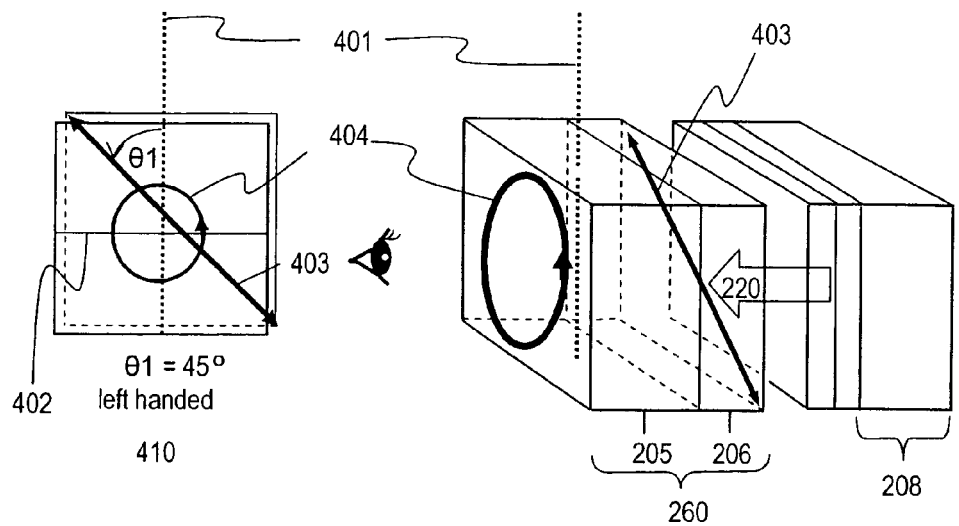
FIG. 4A
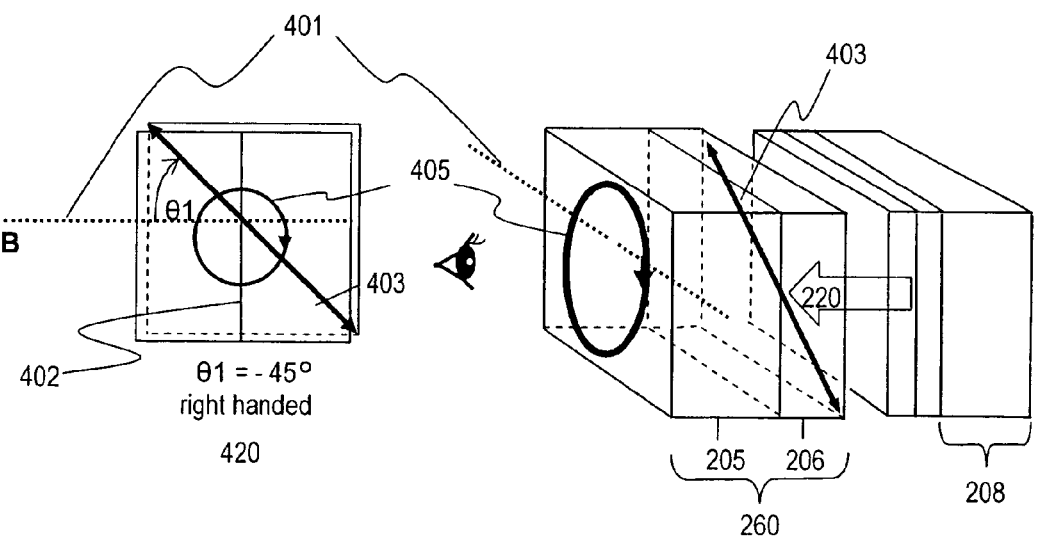
FIG. 4B
FIG. 4

FIG. 6A
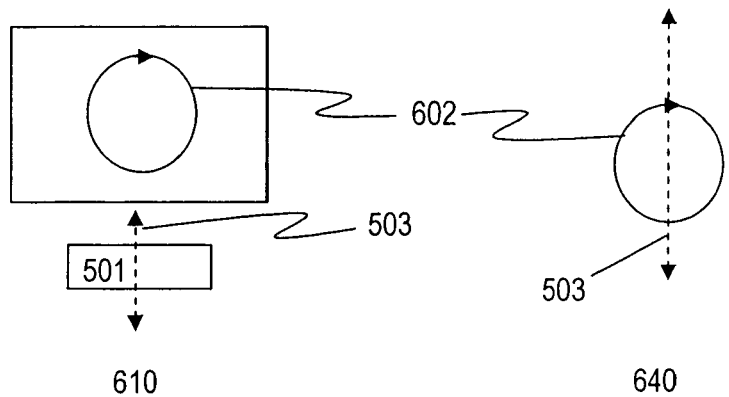
610                   640
FIG. 6B
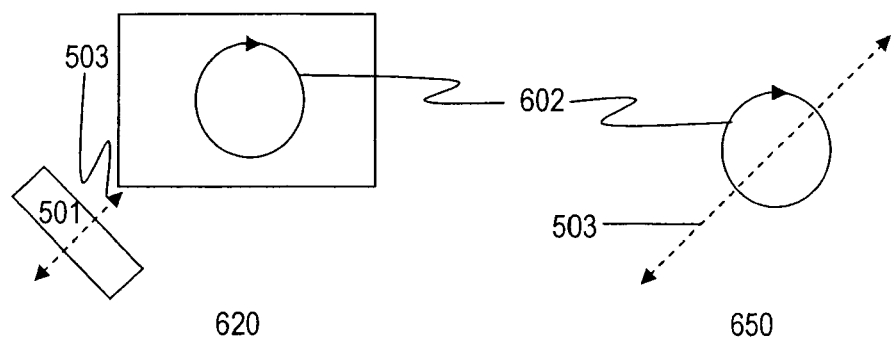
620                   650
FIG. 6C
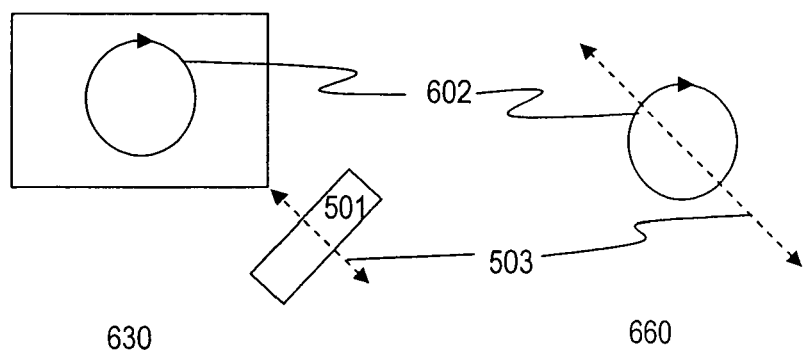
630                   660
FIG. 6

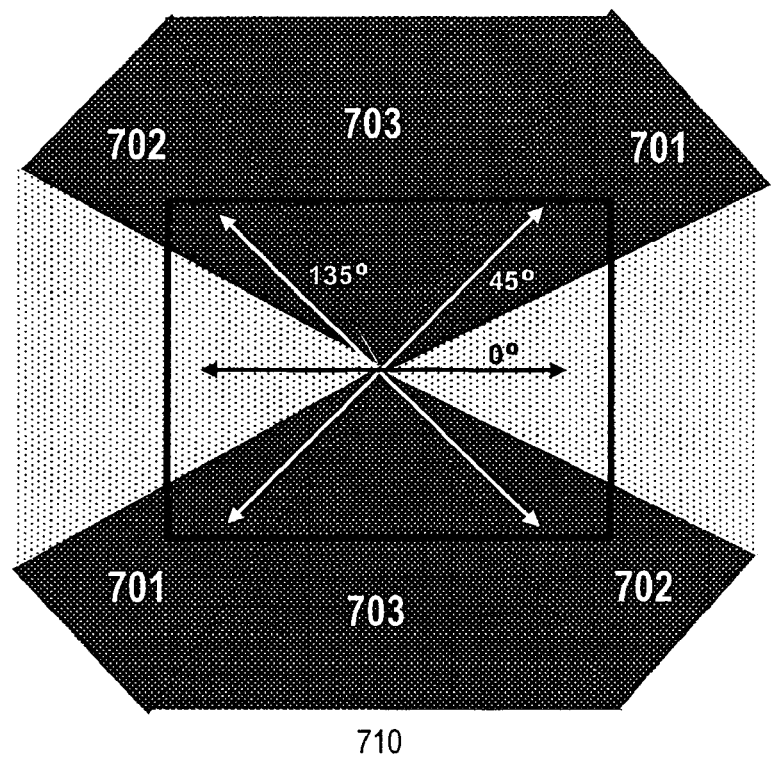
FIG. 7A
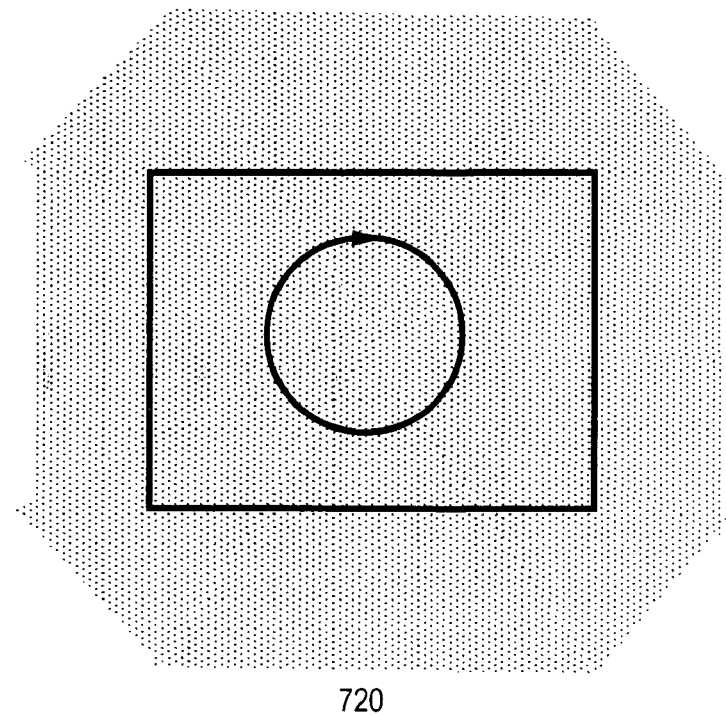
FIG. 7B
FIG. 7

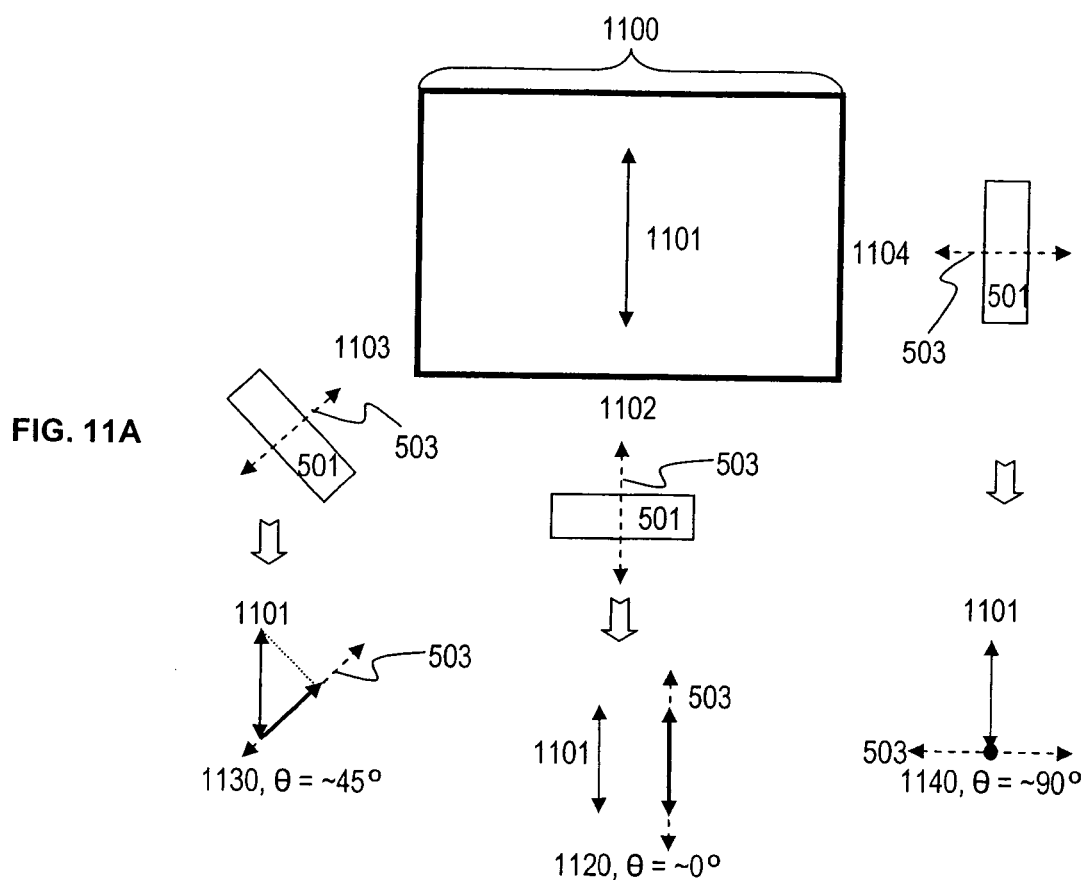
FIG. 11A
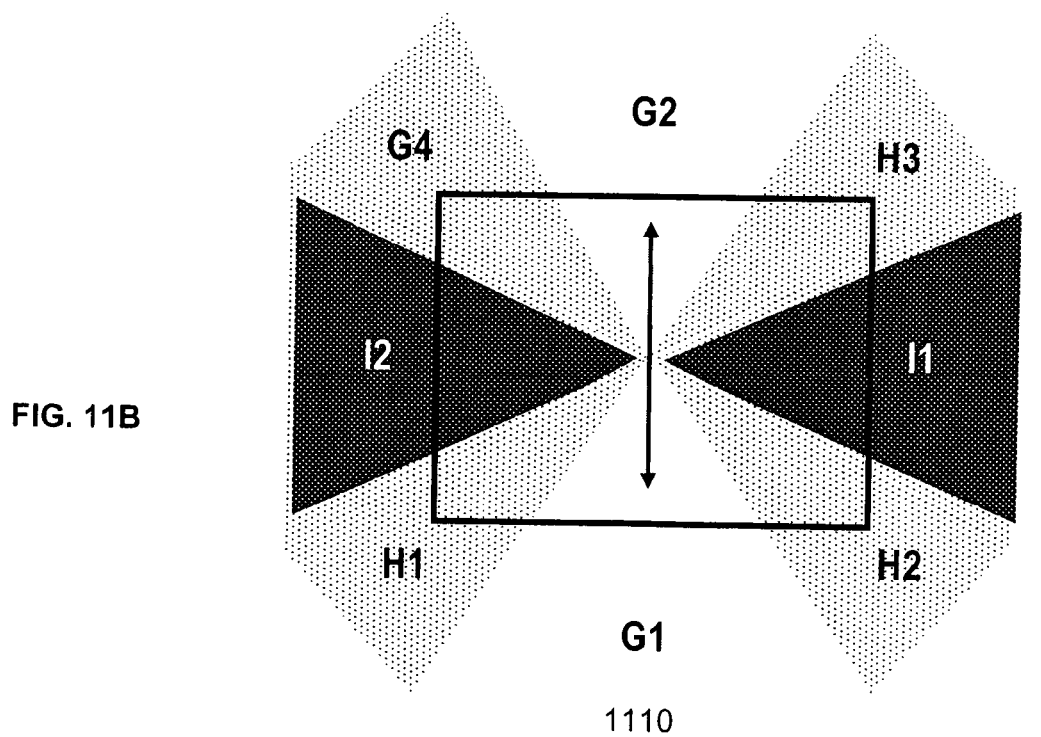
FIG. 11B
FIG. 11

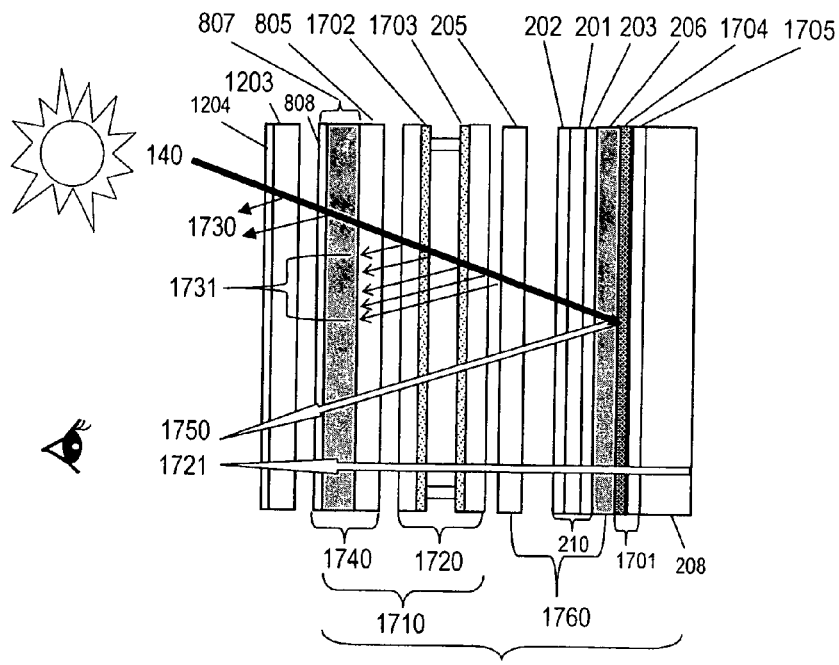
Fig. 17A
Fig. 17C
Fig. 17D
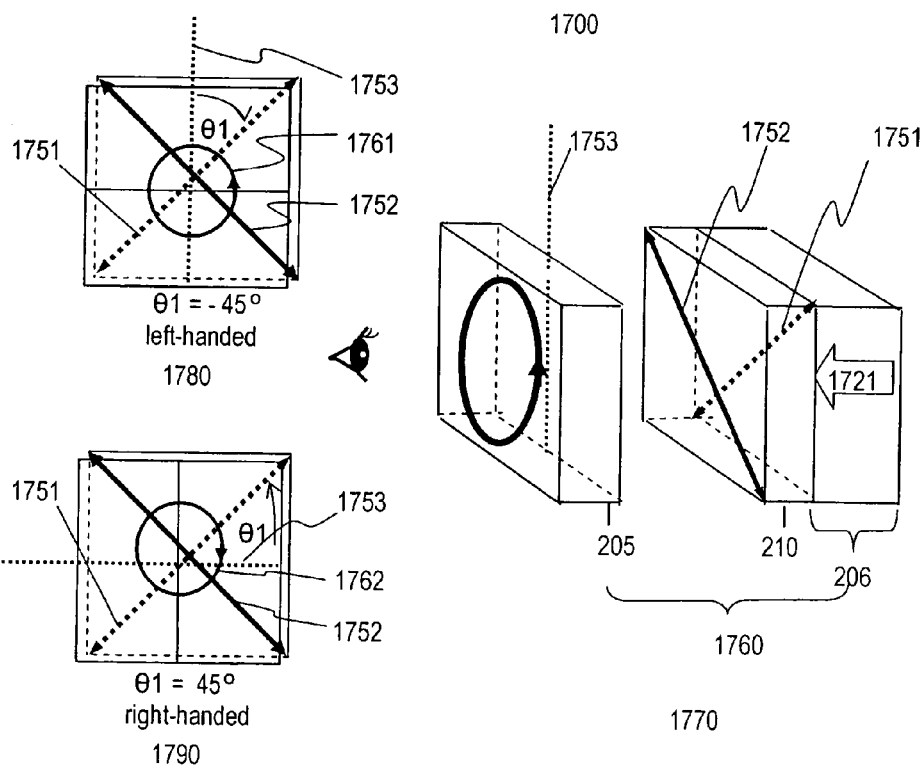
Fig. 17B

CONTROLLING POLARIZATION FOR LIQUID CRYSTAL DISPLAYS

PRIORITY APPLICATION

This application is a continuation-in-part of U.S. patent application Ser. No. 11/135,609 entitled "Controlling Polarization For Liquid Crystal Displays" filed May 23, 2005, which is incorporated herein by reference in its entirety.

FILED OF INVENTION

The present invention relates to liquid crystal displays and polarization.

DESCRIPTION OF RELATED TECHNOLOGY

Many features of liquid crystal displays (LCDs), such as light weight, compact dimensions, low power consumption and high resolution, make LCDs popular choices in various outdoor electronic applications, including for PDAs, navigation systems, rugged notebooks, and information terminals. Thus, the readability of LCD displays in sunlight is desirable in these outdoor applications. The above-mentioned devices are also often integrated with multiple functional parts, such as a resistive touch panel, EMI shield, IR block, and screen heater. However, these functional parts are highly reflective, ~20%, due to the conductive films contained therein. Thus, providing a sunlight readable display system integrated with EMI, IR block, touch panel, and screen heater becomes highly challenging.

Adding lamps to the backlight cell to increase LCD's illumination or adding a reflective sheet to the back of the LCD to utilize partially incident sunlight as part of LCD illumination have been applied to improve the readability of a display. A polarized resistive touch panel, which passes linearly polarized light from the LCD, can be used to limit the reflection of the touch panel. However, the reflection problem is still a concern when it comes to a system integrated with multiple functional parts comprising conductive films, since the reflections of each functional part are additive and become significant. In addition, a common optical property of a conventional liquid crystal display and a polarized touch panel is that they both selectively pass linearly polarized light from the LCD at a transmission direction with respect to the horizontal and vertical axes defined by the display or touch panel that is normally other than a vertical direction. Viewers of outdoor display systems may often wear vertically polarized sunglasses in order to block out horizontally polarized sunlight, especially in some working environments, such as on the sea or in the air, where the horizontally polarized sunlight is particularly strong. A conventional liquid crystal display or a liquid crystal display with a polarized touch screen that emits linearly polarized light would thus appear to be black for viewers wearing polarized sunglasses for common viewing directions, which is inconvenient for outdoor applications.

SUMMARY

Certain embodiments of liquid crystal displays and liquid crystal display functional parts have low reflection for outdoor applications and also have the advantage of being able to provide increased contrast and brightness for certain convenient viewing directions for outdoor viewers wearing polarized sunglasses.

One embodiment, for example, comprises a liquid crystal display comprising: a liquid crystal cell configured to modulate light; a linear polarizer layer forward said liquid crystal cell; a retarder layer comprising one or more retarders; and a display front surface through which said modulated light exits, wherein said one or more retarders and said linear polarizer layer are oriented such that said modulated light that exits said display front surface has an elliptical or circular polarization.

Another embodiment comprises a functional part integrated display comprising: a liquid crystal cell configured to modulate light defining vertical and horizontal axes, said liquid crystal cell comprising a liquid crystal layer sandwiched between two sheets of transparent electrodes; a first linear polarizer forward said liquid crystal cell, said first linear polarizer having a first linear polarization axis; a first retarder layer forward said first linear polarizer, said first retarder layer has a retardance of about $(2n+1)\lambda/4$ and a first slow axis which forms an angle $\theta_1$ with respect to said first linear polarization axis, where n is an integer and $\lambda$ between about 400 to 700 nanometers (nm); a functional element forward of said first retarder layer, said functional element comprising at least one of an EMI shield, an infrared filter, and an LCD heater; a second retarder layer forward of said functional element, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ with respect to said second slow axis; and a display front surface through which said modulated light exits.

Another embodiment comprises a touch panel integrated display comprising a liquid crystal cell configured to modulate light defining vertical and horizontal axes, said liquid crystal cell comprising a liquid crystal layer sandwiched between two sheets of substantially optically transmissive electrodes; a first linear polarizer forward said liquid crystal cell, said first linear polarizer having a first linear polarization axis; a first retarder layer forward said first linear polarizer, said first retarder layer having a retardance of about $(2n+1)\lambda/4$ and a first slow axis which forms an angle $\theta_1$ to said first linear polarization axis, where n is an integer and $\lambda$ is between about 400 nm to 700 nm; a resistive touch panel forward of said first retarder layer; a second retarder layer forward of said resistive touch panel, said second retarder layer has a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which said modulated light exits, wherein said resistive touch panel is isotropic and (m+n) is not zero.

Another embodiment comprise a touch panel integrated liquid crystal display comprising: a liquid crystal cell configured to modulate light defining vertical and horizontal axes, said liquid crystal cell comprising a liquid crystal layer sandwiched between two sheets of transparent electrodes; a first linear polarizer forward said liquid crystal cell, said first linear polarizer having a first linear polarization axis; a first quarter wave retarder forward said first linear polarizer, said quarter wave retarder having a first slow axis; a resistive touch panel forward said first quarter wave retarder; a second quarter wave retarder forward said resistive touch panel, said quarter wave retarder having a second slow axis and a rear surface through which incident light passes; a second linear polarizer forward said second quarter wave retarder, said second linear polarizer oriented relative to said second quarter wave retarder such that said incident light which passes said rear surface of said second quarter wave retarder has a substantially circular polarization; and a display front surface through which said modulated light exits, wherein said second slow axis of said second quarter wave retarder is oriented at an angle other than about 0° or 90° with respect to said horizontal axis and other than at about 90° with respect to said first slow axis of said first quarter wave retarder.

Another embodiment of the invention comprises a polarized touch panel comprises: a resistive touch panel module defining the vertical and horizontal axes; a first quarter wave retarder forward said touch panel module, said first quarter wave retarder having a first slow axis; a second quarter wave retarder rearward said resistive touch panel module, said second quarter wave retarder having a second slow axis which is oriented at about 0° or 90° with respect to said horizontal axis; a linear polarizer forward said first quarter wave retarder, said linear polarizer having a linear polarization axis; and a display front surface through which modulated light of a display exits, wherein said first slow axis of said first quarter wave retarder is oriented at an angle other than about 90° with respect to said horizontal axis and other than about 90° relative to said second slow axis of said second quarter wave retarder.

Another embodiment of the invention comprises a polarized touch panel comprising: a resistive touch panel module defining the vertical and horizontal axes; a first retarder layer forward said touch panel module, said first retarder layer having a retardance of about $(2n+1)\lambda/4$ and a first slow axis, where n is an integer and $\lambda$ is 400 nm to 700 nm; a linear polarizer forward said first retarder layer, said linear polarizer having a linear polarization axis; a second retarder layer forward said linear polarizer; and a display front surface through which modulated light of a display exits, wherein said slow axis of said first retarder layer is set at an angle of about ±45° relative to said linear polarization axis of said linear polarizer.

Another embodiment of the invention comprises a reflective functional part integrated display comprising: a liquid crystal cell configured to modulate light defining vertical and horizontal axes, said liquid crystal cell comprising a liquid crystal layer sandwiched between two sheets; a partial reflector rearward said liquid crystal layer; a first linear polarizer forward said liquid crystal cell, said first linear polarizer having a front surface and a first linear polarization axis; a first retarder layer forward said first linear polarizer, said first retarder layer having a front surface, a rear surface, a retardance of about $(2n+1)\lambda/4$, and a first slow axis which forms an angle $\theta_1$ to said first linear polarization axis, where n is an integer and $\lambda$ is between about 400 nm to 700 nm; a reflective functional part forward of said first retarder layer, said reflective functional part having a rear surface and comprising at least one of a resistive touch panel, an EMI shield, an infrared filter, and an LCD heater; a second retarder layer forward of said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which said modulated light exits.

Another embodiment of the invention comprises a reflective functional part integrated display comprising: a liquid crystal cell configured to modulate light defining vertical and horizontal axes, said liquid crystal cell having a front surface and comprising a liquid crystal layer sandwiched between two sheets; a partial reflector rearward said liquid crystal cell; said partial reflector comprising a reflective polarizer having a first linear polarizing axis; a first retarder layer forward said liquid crystal cell, said first retarder layer having a front surface, a rear surface, a retardance of about $(2n+11)\lambda/4$, and a first slow axis which forms an angle $\theta_1$ to said first linear polarization axis, where n is an integer and $\lambda$ is between about 400 nm to 700 nm; a reflective functional part forward of said first retarder layer, said reflective functional part having a rear surface and comprising at least one of a resistive touch panel, an EMI shield, an infrared filter and an LCD heater; a second retarder layer forward of said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which said modulated light exits.

Another embodiment of the invention comprises a reflective functional part integrated transflective display comprising: a liquid crystal cell configured to modulate light defining vertical and horizontal axes, said liquid crystal cell having a front surface and comprising a liquid crystal layer sandwiched between two sheets; a first linear polarizer rearward said liquid crystal cell, said first linear polarizer having a rear surface and a first linear polarization axis; a partial reflector rearward said first linear polarizer; a first retarder layer forward said liquid crystal cell, said first retarder layer having a front surface, a rear surface, a retardance of about $(2n+1)\lambda/4$, and a first slow axis which forms an angle $\theta_1$ to said first linear polarization axis, where n is an integer and $\lambda$ is between about 400 nm to 700 nm; a reflective functional part forward of said first retarder layer, said reflective functional part having a rear surface and comprising at least one of a resistive touch panel, an EMI shield, an infrared filter, and an LCD heater; a second retarder layer forward of said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which said modulated light exits.

Another embodiment of the invention comprises a reflective functional part integrated transflective display comprising: a transflective liquid crystal display module having a module front surface that selectively outputs linearly polarized light oriented along a first linear polarization axis, said liquid crystal display module comprising a liquid crystal cell, a partial reflector, and a backlight module; a first retarder layer forward said liquid crystal display module, said first retarder layer having a front surface, a rear surface, a retardance of about $(2n+1)\lambda/4$, and a first slow axis, which forms an angle $\theta_1$ to said first linear polarization axis, where n is an integer and $\lambda$ is between about 400 nm to 700 nm; a reflective functional part forward said first retarder layer, said reflective functional part having a rear surface; a second retarder layer forward said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which light from said backlight module exits. In some embodiment, said reflective functional part comprises at least one of a resistive touch panel, an EMI shield, an infrared filter, and an LCD heater.

Another embodiment of the invention comprises a reflective functional part integrated transflective display comprising: a liquid crystal display module having a module front surface, said liquid crystal display module comprising, from front to rear, a liquid crystal cell, a partial reflector comprising a reflective polarizer having a first linear polarization axis, and a light module; a first retarder layer forward said liquid crystal display module, said first retarder layer having a front surface, a rear surface, a retardance of about $(2n+1)\lambda/4$, and a first slow axis, which forms an angle $\theta_1$ to said first linear polarization axis, where n is an integer and $\lambda$ is between about 400 nm to 700 nm; a reflective functional part forward said first retarder layer, said reflective functional part having a rear surface; a second retarder layer forward said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which light from the light module exits. In some embodiment, said reflective functional part comprises at least one of a resistive touch panel, an EMI shield, an infrared filter, and an LCD heater.

Another embodiment of the invention comprises a reflective functional part integrated display comprising: a liquid crystal display module having a module front surface that selectively outputs linearly polarized light oriented along a first linear polarization axis, said liquid crystal display module comprising, from front to rear, a liquid crystal cell, and a light module; a reflective functional part forward said liquid crystal display module, said reflective functional part having a rear surface; a second retarder layer forward said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which light from said light module exits, wherein said liquid crystal display module front surface includes at least one of an anti-reflection treatment and a diffusing structure. In certain embodiments anti-reflection treatment comprises a multi-layer AR coating or a laminated sheet member with AR coating. In some embodiment, said reflective functional part comprises at least one of a resistive touch panel, an EMI shield, an infrared filter, and an LCD heater.

Another embodiment of the invention comprises a reflective functional part integrated display comprising: a liquid crystal display module having a module front surface that selectively outputs linearly polarized light oriented along a first linear polarization axis, said liquid crystal display module comprising, from front to rear, a liquid crystal cell and a light module; a first retarder layer forward said liquid crystal display module, said first retarder layer having a front surface, a retardance of about $(2n+1)\lambda/4$, and a first slow axis which forms an angle $\theta_1$ to said first linear polarization axis, where n is an integer and $\lambda$ is between about 400 nm to 700 nm; a reflective functional part forward said first retarder layer, said reflective functional part having a rear surface; a second retarder layer forward of said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which light exits, wherein at least one of said first retarder layer front surface and said reflective functional part rear surface includes at least one of an anti-reflection treatment and a diffusing structure. In certain embodiments the anti-reflection treatment comprising a multi-layer AR coating or a laminated sheet member with AR coating. In some embodiment, said reflective functional part comprises at least one of a resistive touch panel, an EMI shield, an infrared filter, and an LCD heater.

BRIEF DESCRIPTION OF THE DRAWINGS

FIGS. 1A and 1B are schematic diagrams used in the discussion of retarders and polarization conversion.

FIGS. 1C-1H are schematic diagrams illustrating conversion of a linearly polarized light wave into circular polarization using a retarder layer comprising various retardation plates.

FIGS. 4A and 4B are front and cross-sectional views of LCD display configurations comprising a first retarder layer and a first linear polarizer that produce left-handed and right-handed circularly polarized light, respectively.

FIGS. 6A-6C are schematic diagrams showing the effect of viewing direction on the apparent brightness of an NLP-LCD to a viewer wearing polarized sunglasses.

FIG. 7A is a schematic diagram of the apparent brightness of various viewing zones for a conventional LCD or an LCD integrated together with a polarized touch screen that produces linearly polarized light.

FIG. 7B is a schematic diagram showing the apparent brightness of various viewing zones for the NLP-LCD 200 which outputs circularly polarized light to viewers wearing polarized sunglasses.

FIGS. 11A and 11B are schematic diagrams illustrating the apparent brightness of the different viewing zones of a display system with 90° polarization axis direction as seen by a viewer wearing polarized sunglasses.

FIG. 17A is a schematic cross-sectional view of a polarized touch panel integrated together with an alternative circularly polarized liquid crystal display.

FIG. 17B is a perspective view of the LCD display 1700 configuration of FIG. 17A showing a first circularly polarizing plate formed from a first retarder layer, a liquid crystal cell, and a first linear polarizer.

FIG. 17C is a front view of the LCD display 1700 configuration of FIG. 17B showing the first retarder layer, the liquid crystal cell, and the first linear polarizer arranged to produce left-handed circularly polarized light.

FIG. 17D is a front view of the LCD display 1700 configuration of FIG. 17A showing the first retarder layer, the liquid crystal cell, and the first linear polarizer arranged to produce right-handed circularly polarized light.

DETAILED DESCRIPTION OF CERTAIN EMBODIMENTS

Figure 2:
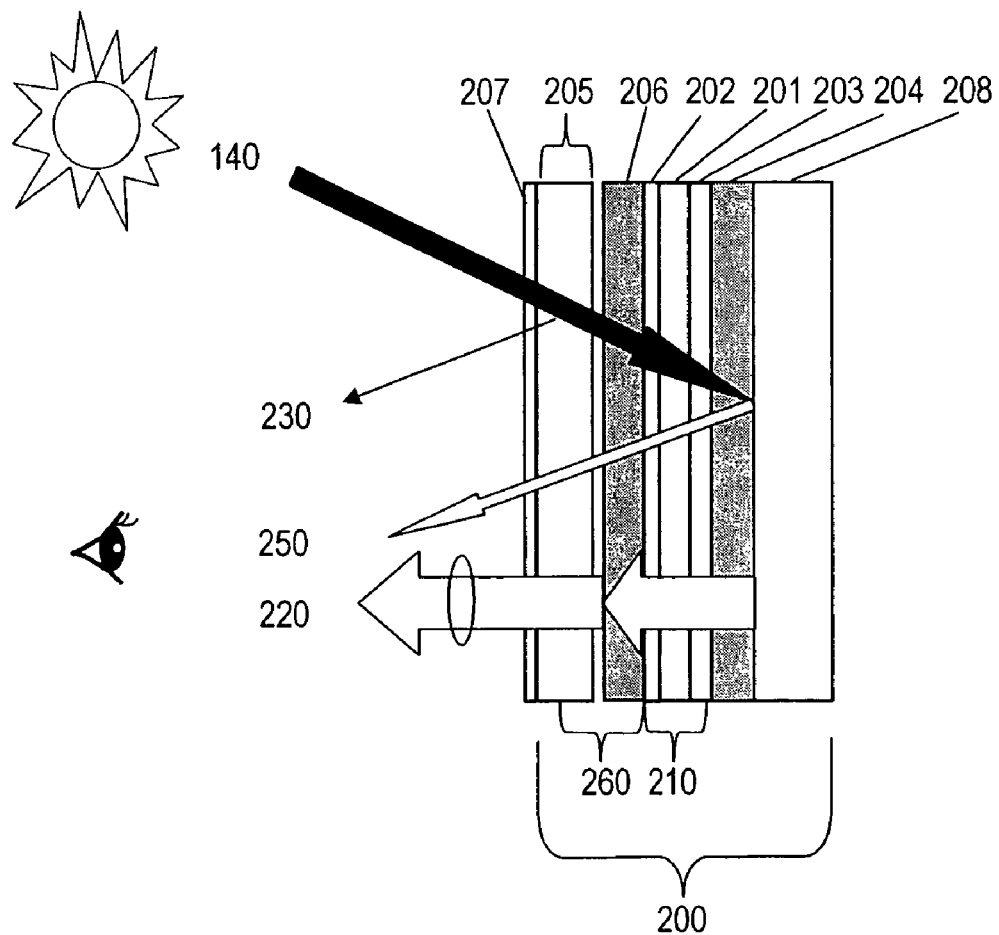
FIG. 2 is a schematic cross-sectional view of a liquid crystal display having non-linearly polarized output.

A retardation plate is a birefringent optical element, in which light propagating longitudinally in a z-axis direction travels with different velocities for different polarizations oriented along orthogonal x and y axes. Thus, the light wave may have orthogonal polarization components, one of which is retarded relative to the other, by an amount that may be expressed as a retardance, R. The retardance R is determined by $d(N_s-N_f)$, wherein $N_s$ is the refractive index of the slow axis of the retardation plate, $N_f$ is the fast axis of the retardation plate, and d is the physical thickness of the plate. A retardation plate with retardance, R, will cause a phase difference of $2\pi R/\lambda$ between the orthogonal polarizations of a light wave that passes therethrough. Thus, when the angle between the linear polarization axis of the incident light beam and the slow axis of a quarter wave plate (where $R=\lambda/4$) is at about 45 degrees, a phase difference of $2\pi R/\lambda=90°$ between the orthogonal polarizations of the incident light beam results. Hence, the linearly polarized light wave is converted into a circularly polarized light wave with rotation directions either clockwise or counterclockwise. If the retardance is other than $(2n+1)\lambda/4$, where n is an integer, or the slow axis of a quarter wave plate and the linear polarization axis of the incident light beam are at angles other than 45 degrees, elliptically polarized light is produced. An integer is defined herein as including the values . . . −2, −1, 0, 1, 2 . . . .

A linearly polarized light wave can be transformed into circularly polarized light by using various retarder layers comprising one or more retarder plates in proper arrangement. To facilitate the discussion below, quarter wave plates, half wave plates, and full wave plates will be used as examples. In FIG. 1A, a quarter wave plate 102 is shown with a slow axis indicated as a dotted line. FIG. 1A also shows a half wave plate 103 and a full wave plate 104 with a slow axis indicated as a dotted line. A linear polarizer 105 is shown with a polarization axis indicated as the double-headed arrow. Linearly polarized light 106 is shown with the polarization also indicated as the double-headed arrow. Right-handed circularly polarized light 107 is shown as a circle with an arrow going clockwise. Left-handed circularly polarized light 108 is shown as a circle with an arrow going counterclockwise.

Although the term plate is used in describing retarders herein, retarders may comprise a thin or thick film, a layer, a sheet, or a plate, having varying degrees of thickness, rigidity, and other optical and non-optical properties. Reference to a retarder plate is thus not limiting as the retarder may likewise comprise a film, layer, sheet or other medium that introduces retardance. Similarly, the film, layer, sheet, or plate may comprise multiple portions itself. Accordingly, layers are described as comprising plates but may otherwise comprise sublayers comprising films, sheets, etc.

As illustrated in FIG. 1B, a retarder layer comprising quarter wave plates, half wave plates, or full wave plates with various orientations of slow axes will result in different "effective retardances". For example, retarder layer 110, comprising two quarter wave plates with perpendicular slow axes as shown, has an effective retardance equivalent to 0. Retarder layer 120 comprising a full wave plate and two quarter wave plates having perpendicular slow axes as shown, has an effective retardance equivalent to a full wave plate. Additionally, retarder layer 130, comprising a full wave plate and a half wave plate as shown, has an effective equivalent to a half wave plate with slow axis being horizontal.

FIGS. 1C-1H show a plurality of retarder arrangements 140, 150, 160, 170, 180, and 190 comprising combinations of retardation plates having their relative orientations varied as indicated. The polarization axis of the linearly polarized light 106 incident on the slow axis of retardation plate 102 is at about 45°. Each of the retarder layers shown contains an odd number of equivalent quarter wave plates with slow axis as shown in each arrangement. For example, the arrangement 140 in FIG. 1C is equivalent to a single quarter plate having an slow axis in the vertical direction. For example, the arrangement 150 in FIG. 1D is equivalent to a three quarter plates having a slow axis in the vertical direction, etc. Though having different effective retardances, each arrangement invariably circularly polarizes the linear polarization 106 producing either clockwise or counterclockwise circularly polarized light.

Although not shown, there are many other combinations of retarder layers having an effective retardance of $(2n+1)\lambda/4$, where n is an integer (e.g., . . . −2, −1, 0, 1, 2 . . . ) and $\lambda/4$ is between about 400 nm-700 nm, which produce either clockwise (right-handed), or counterclockwise (left-handed) circularly polarized light. In some embodiments, the retardation plates comprising the retarder layer can be loosely stacked or laminated. As described above, these layers may comprise sublayers comprising different layers of film. It is also applicable to manufacture a single thick sheet retarder, which has $(2n+1)\lambda/4$ equivalent retardance and which circularly polarizes a linearly polarized light like a single quarter wave plate. A thick film may also be deposited. Thus, "a retarder layer" having $(2n+1)\lambda/4$ retardance, comprised of a single sheet retarder or a thick film, or a stack of laminated or loose sheets or other sublayers comprising quarter wave plates, half wave plates, or full wave plates, would have a "collective" slow axis and a "collective" fast axis that functions similarly to the slow and fast axes of a single quarter wave plate. Such a retarder layer will be termed as "quarter wave retarder." As discussed above, an incident angle other than 45° or −45° (and 0° and 90°) between the polarization axis of linearly polarized light and the slow axis of a quarter wave retarder will result in elliptically polarized light. Passing light through a retarder layer with retardance other than about $(2n+1)\lambda/4$ also results in elliptically polarized light.

Referring now to FIG. 2, a liquid crystal display having non-linearly polarized light output, abbreviated as NLP-LCD hereafter, is shown. The NLP-LCD 200 includes, with viewer's side as the front side, a liquid crystal cell 210, comprised of a liquid crystal layer 201 sandwiched between a front transparent substrate 202 and a rear transparent substrate 203 containing electrodes. The front substrate 202 can be a thin glass sheet containing transparent electrodes, such as in a transmissive or transflective type of TFT liquid crystal display. The front substrate 202 can also be a thin glass sheet with a stack of transparent retardation compensator plates or layers having a surface coated with transparent electrodes, such as in a reflective, transflective, or transmissive type of TN/STN liquid crystal display. The NLP-LCD 200 can also include a rear polarizer 204 and a backlight module 208 in the rear side of liquid crystal cell 210. The backlight module 208 can be a high efficiency transmissive backlight cell assembly comprising sheets of brightness enhancement films and other polymeric films for enhancing light transmission and optical performances. The backlight module 208 can also be a transflective or reflective type of lighting device. The reflective function can be implemented by reflective electrodes (not shown) deposited on the front surface of the rear substrate 203, or a sheet member with transflective or reflective property (not shown) placed on the rear side of the rear substrate 203. For example, a combination of a diffusing element and a reflective polarizer (not shown) will provide substantially optimized optical performances under the sun, which will be discussed further below. However, embodiments may include any conventional backlight cell or high brightness backlight cell, e.g., with edge or backside lamps.

The NLP-LCD 200 also includes a first linear polarizer 206 bonded to the front surface of the liquid crystal cell 210. The NLP-LCD 200 further comprises a first retarder layer 205, for example, a quarter wave retarder having a retardance of about $(2n+1)\lambda/4$ where n is an integer and $\lambda$ is between about 400 nm-700 nm, forward of the first linear polarizer 206. The first retarder layer 205 has a front surface 207, e.g., with a haze value less than about 30%. The low haze value of the surface is useful for reducing the specular reflections for clear outdoor visibility. The front surface 207 can be a highly efficient multilayer anti-reflection coating, for example, having reflection less than about 1.5%, to reduce the surface reflection 230 and to maximize the entry of light beam 140 for reflective illumination 250. The front surface 207 can further be a separate transmissive substrate or layer comprising, e.g., glass or plastic, such as PET, PEN, TAC, PC, ARTON, etc., having its low haze front surface coated with the high efficient multilayer anti-reflection coating, for example, having reflection less than about 1.5%, and with its rear surface being laminated to or coated on the front surface of the first retarder layer 205 with index matching pressure sensitive adhesive (PSA). In other embodiments, the front surface 207 may comprise a retarder or a thin film coating or multilayer disposed thereon. Still other configurations are possible (for example, the anti-reflective coating may be located elsewhere).

Figure 3:
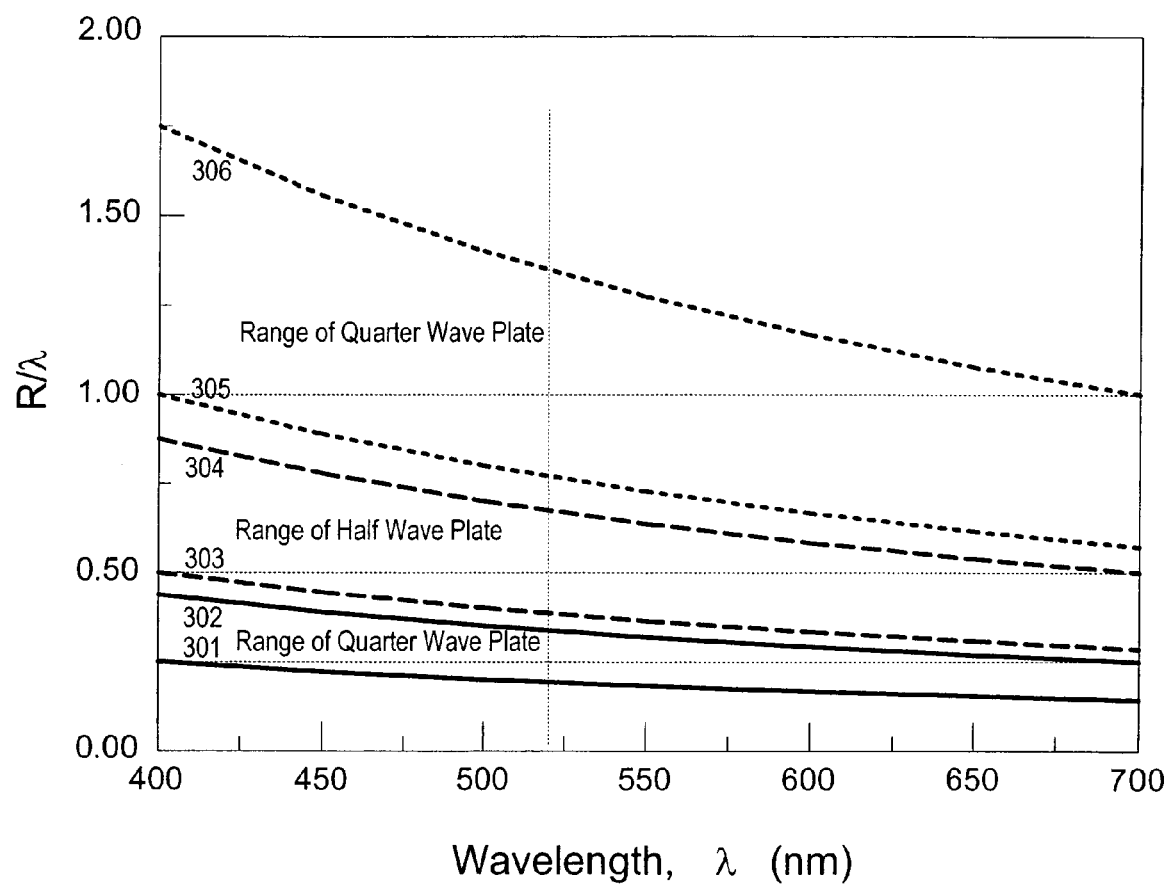
FIG. 3 is a plot on axes of retardance in waves (R/$\lambda$) versus wavelength showing the dispersion effect and the range of wave plate retardation.
Figure 5:
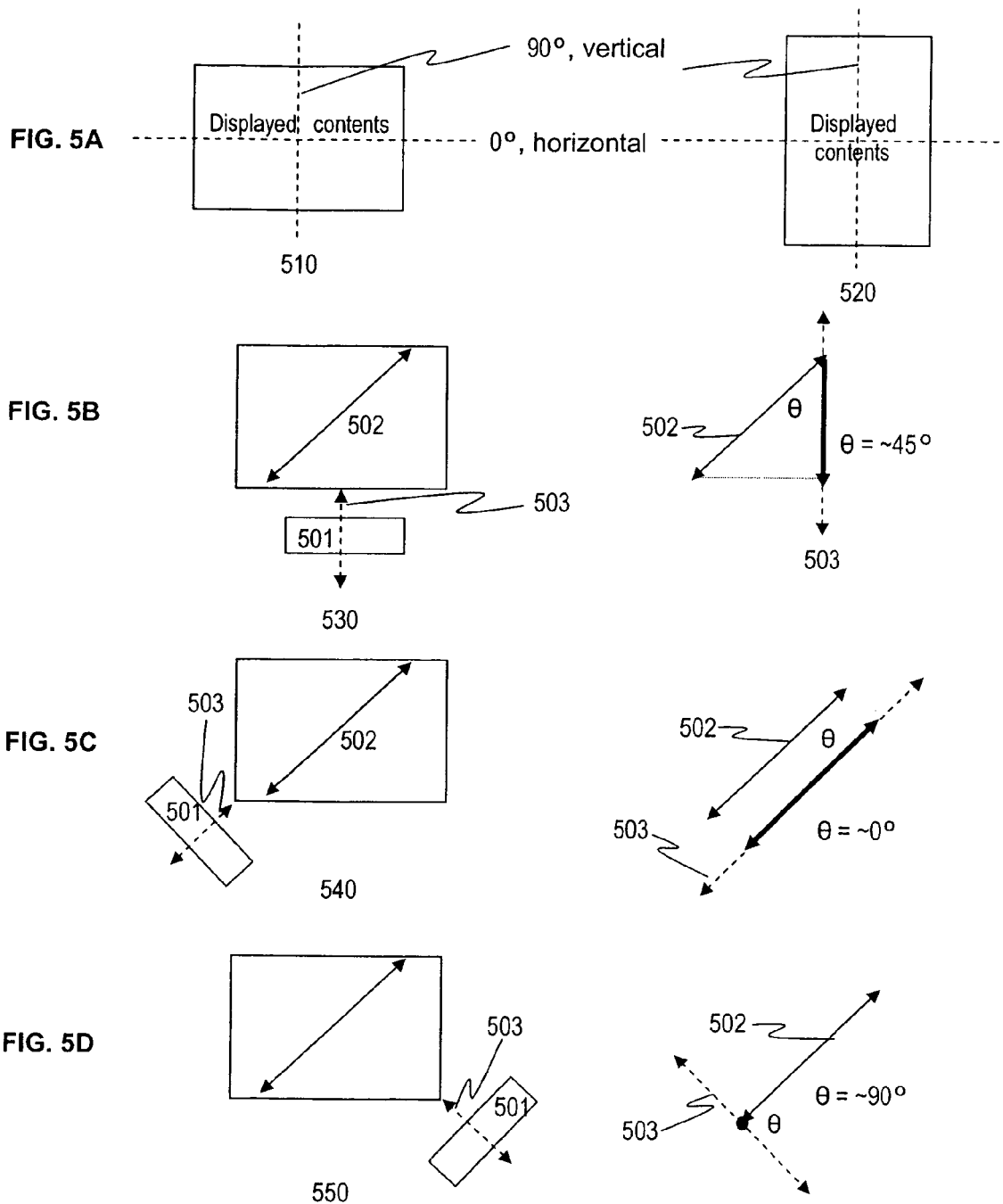
FIGS. 5A-5D are schematic diagrams illustrating the effect of viewing direction on the apparent brightness of a conventional LCD or a conventionally polarized touch screen to a viewer wearing polarized sunglasses.

The first retarder layer 205 may be a single sheet retarder or a stack of laminated or loose sheets or may be a film or multiple films. This first retarder layer may comprise various combinations of retarder plates or layers or sublayers, e.g., quarter wave plates, half wave plates, or full wave plates as previously discussed. A quarter wave plate with $R/\lambda=0.25$, where $\lambda$ is the wavelength in the visible light region, would be a particularly suitable retardation plate for the application. However, a perfect quarter wave plate with $R/\lambda=0.25$ is difficult to make due to the dispersion effect, as shown in FIG. 3. Thus, quarter wave plates with $R/\lambda$ values in the range between curves 301 and 302, as shown in FIG. 3, can be used. For example, a quarter wave plate having a $R/\lambda$ value between about 0.216 and 0.315 at wavelength about 520 nm can be used. Similarly, embodiments may include half wave plates with $R/\lambda$ values in the range between curves 303 and 304, as shown in FIG. 3. For example, a half wave plate having an $R/\lambda$ value between about 0.432 and 0.630 at a wavelength of about 520 nm may be employed. Embodiments may include a full wave plate have an $R/\lambda$ value in the range between curves 305 and 306, as shown in FIG. 3. A full wave plate having, for example, an $R/\lambda$ value between about 0.864 and 1.260 at wavelength about 520 nm may be used. Values outside these ranges are also possible. The rear surface of the first retarder layer 205 can be laminated to the front surface of the first linear polarizer 206 with an index-matched pressure sensitive adhesive (PSA) to form a first circularly polarizing retarder 260 as a part of the display.

FIGS. 4A and 4B show diagrams of configurations 410 and 420 comprising the first retarder layer 205 and the first linear polarizer 206 that produce left-handed and right-handed circularly polarized light, respectively. As discussed above with reference to FIG. 1, the first retarder layer 205 has an optical slow axis 401 and an optical fast axis 402 and operates as a single quarter wave plate. The first linear polarizer 206 has a polarization axis 403. Viewed from the front side of the retarder layer looking towards the LCD light source 208, the configuration of the first retarder layer 205 and the first linear polarizer 206 can be defined by the angle, $\theta_1$, between the slow axis 401 of the first retarder layer 205 and the polarization axis 403 of the first linear polarizer 206. As generally defined, angle $\theta_1$ has a positive value, if it increases from the slow axis 401 of the first retarder layer counterclockwise to the polarization axis 403 of the first linear polarizer 206. On the other hand, $\theta_1$ has a negative value, if it increases from the slow axis 401 of the first retarder layer 205 clockwise to the polarization axis 403 of the first linear polarizer 206.

Projections of two different configurations 410 and 420 between the first retarder layer 205 and the first linear polarizer 206 are shown in FIGS. 4A and 4B, respectively. In configuration 410 in FIG. 4A, in which $\theta_1$ is substantially 45°, light 220 emitted by the LCD is transformed into a counterclockwise circularly polarized light wave 404, which is a left-handed circular polarization by definition. The circularly polarizing retarder 260, comprising the first retarder layer 205 and the first linear polarizer 206, is thus said to have a left-handed circular polarization configuration. Likewise, as shown in configuration 420 in FIG. 2B, in which $\theta_1$ is substantially −45°, light 220 emitted by the LCD is transformed into a clockwise circularly polarized light wave 405, which is a right-handed circular polarization by definition. The circularly polarizing retarder 260 is said to have a right-handed circular polarization configuration. Angles other than −45° or 45° (and 0° and 90°) cause the emitted light to have elliptical polarization.

Referring now back to FIG. 2, by suitably disposing the first retarder layer 205 in relation to the linear polarizer 206, the NLP-LCD 200 emits a non-linearly polarized light 220— for example, an elliptical or a circularly polarized light depending on how the first retarder 205 and the first linear polarizer 206 are oriented. Though being elliptically or circularly polarized, the illumination intensity of the NLP-LCD 200 is substantially maintained and the optical performance of the NLP-LCD performs at least as well as a conventional linearly polarized light emitting LCD. The advantage of having a circularly polarized illumination, for example, in enhancing displays performance for wearer's of polarized sunglasses is discussed in further detail below.

FIGS. 5A-5D are diagrams schematically illustrating the effect of viewing direction on the apparent brightness of a conventional LCD or a conventional polarized touch screen to a viewer wearing polarized sunglasses. Usually, the light polarization direction of a liquid crystal display is determined by the orientation of the polarization axis of the linear polarizer disposed forward of the liquid crystal cell, which is described with respect to display modulator. Directions of 0° (horizontal) and 90° (vertical) in a landscape and a portrait view of a display module (or a touch panel module) are shown in 510 and 520 in FIG. 5A. The polarization direction of a conventional TFT LCD or a polarized touch panel is typically 45° or 135°, and substantially 0° in some larger size LCDs. Polarized sunglasses usually have a vertical transmission in order to block out the strong horizontally polarized scattered/reflected sunlight. Depending on the viewing position of a viewer 501 wearing polarized sunglasses, the polarization direction 502 light from the LCD or touch panel, e.g. 45° in FIGS. 5B-5C, forms an angle θ with the transmission direction 503 of the polarized sunglasses, which is always vertical to viewer's eyes. Hence the apparent brightness of the LCD to the viewer will bear a factor of cos θ to the actual brightness of LCD. Thus, when the viewer is in the most common straight front viewing position shown in 530 in FIG. 5B, θ is in about 45°, and approximately half of the LCD brightness will be seen by viewer. When the viewer moves to his or her left side, as shown in 540 in FIG. 5C, θ is about 0° and cos 0° equals to 1, so most light from the LCD will be seen. When the viewer moves to his or her right side, as shown in 550, θ is about 90° and since cos 90° equals to 0, little of the LCD light is seen from this viewing position.

FIGS. 6A-6C show the effect of viewing direction on the apparent brightness of the NLP-LCD 200 to a viewer wearing polarized sunglasses. The light from the NLP-LCD 200 is circularly polarized to be either left-handed or right-handed. The viewer is indicated by 501 and the transmission direction of the polarized sunglasses is indicated as 503. The circularly polarized LCD light is indicated as 602, which is right-handed in this illustration. When the viewer 501 is in the front position 610, the relationship of the circularly polarized light 602 to the transmission direction of polarized sunglasses 503 is shown in 640. About one half of the circularly polarized light is selectively passed by the polarized sunglasses. When the viewer 501 moves to the left 620 as shown in FIG. 6B, the relationship of the circularly polarized light 602 to the transmission direction of polarized sunglasses 503 is shown in 650. Again, about one half of the circularly polarized light is selectively passed by the polarized sunglasses. When viewer moves to the right 630 as shown in FIG. 6C, the relationship of the circularly polarized light 602 to the transmission direction of polarized sunglasses 503 is shown in 660. About one half of the circularly polarized light is again selectively passed by the polarized sunglasses. Thus, in substantially all viewing positions of the NLP-LCD 200, about one half of the LCD brightness is visible to a viewer wearing polarized sunglasses.

FIG. 7A shows a diagram of the apparent brightness of various viewing zones for a conventional LCD or an LCD integrated together with a polarized touch screen that produces linearly polarized light. As discussed below with reference to FIGS. 5A-5C, a conventional LCD or a regular polarized touch panel integrated LCD with linearly polarized light appears black to viewers wearing polarized sunglasses either in zones 701, zones 702, or zones 703 depending on whether the light transmission direction is 135°, 45°, or 0°, respectively.

FIG. 7B shows the apparent brightness of various viewing zones for the NLP-LCD 200 which outputs circularly polarized light to viewers wearing polarized sunglasses. Discussions in connection with FIGS. 6A-6C demonstrate that the NLP-LCD 200 with circularly polarized light has a superior optical property for outdoor applications, as it can deliver consistent brightness in viewing zones all around NLP-LCD to viewers wearing polarized glasses regardless viewer's viewing positions. Thus, NLP-LCD 200 has advantage of a conventional LCD yet it offers substantially consistent brightness in all viewing directions to viewer wearing polarized sunglasses. A more convenient and comfortable visual experiences is provided compared to a conventional LCD. Although a circular polarization output by the NLP-LCD 200 is given as an example to illustrate the advantage of providing a liquid crystal display having a non-linearly polarized light over the conventional liquid crystal display with linearly polarized light, it is possible to have a liquid crystal display with elliptically polarized light and still provide improvement by mitigating the effect of the dark zones for viewers wearing polarized sunglasses.

In various embodiment, convenient viewing zones of a display are achieved by converting the light polarization direction output by the display to 90 degrees. The advantages of such an arrangement is discussed more fully below.

Figure 8:
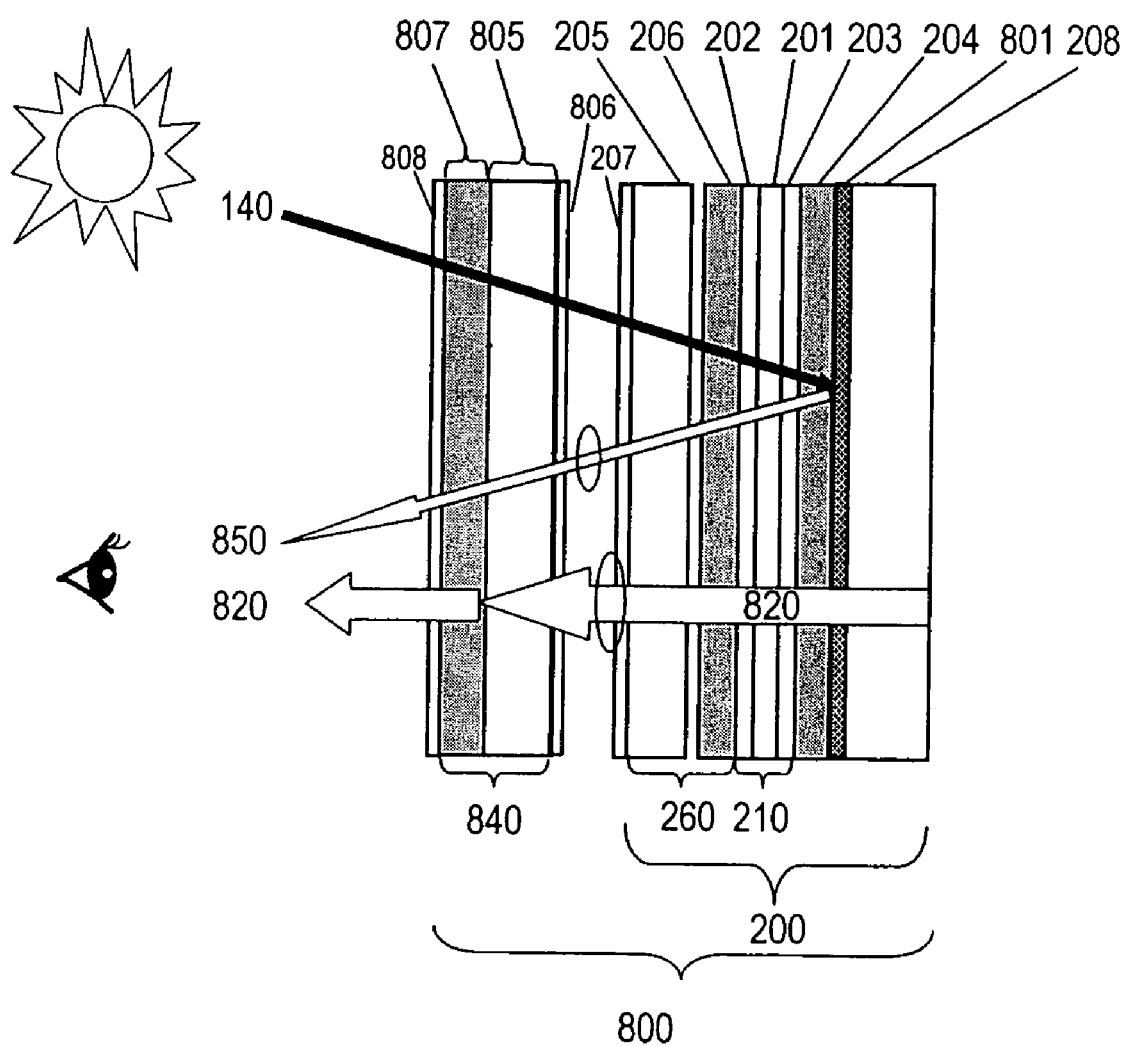
FIG. 8 is a schematic cross-sectional diagram of an NLP-LCD shell structure comprising first and second circularly polarizers that produces linearly polarized light, e.g., having a polarization direction of 90°.

Referring now to FIG. 8, a diagram of an exemplary NLP-LCD shell structure 800 is shown. The NLP-LCD structure 800 comprises, a front side facing the viewer, an NLP-LCD 200 (see FIG. 2) with a transflective sheet 801, a second retarder layer 805 having a rear surface 806 forward of the first retarder layer 205, and a second linear polarizer 807 forward of the second retarder layer 805. In certain preferred embodiments, the second retarder layer 805 is a quarter wave retarder having a retardance of about $(2m+1)\lambda/4$, where m is an integer and $\lambda$ is between about 400 nm-700 nm. This second retarder layer 805 can be, e.g., a single sheet retarder or a stack of laminated or loose sheets or a film or multiple films. Combinations of quarter wave plates, half wave plates, or full wave plates may be used. Quarter wave plates with $R/\lambda$ value in the range, e.g., between curves 301 and 302, as shown in FIG. 3, can be used. For example, a quarter wave plate of $R/\lambda$ value between about 0.216 and 0.315 at wavelength 520 nm may be employed. Half wave plates with $R/\lambda$ value in the range, e.g., between curves 303 and 304 as shown in FIG. 3 can be used. For example, a half wave plate of $R/\lambda$ value between about 0.432 and 0.630 at wavelength about 520 nm may be used. And, full wave plates with $R/\lambda$ value in the range, e.g., between curves 305 and 306 as shown in FIG. 3 can be used. For example, a full wave plate of $R/\lambda$ value between about 0.864 and 1.260 at wavelength about 520 nm may be employed.

The rear surface of the second linear polarizer 807 can be laminated to or formed on the front surface of the second retarder layer 805. The polarization axis of the second linear polarizer 807 may be set substantially at an angle in the range of about ±(25°-65°) to the slow axis of the second retarder layer 805, for example, at about ±45° to form the second circularly polarizing plate 840. However, as discussed below, the polarization axis of the second linear polarizer 807 can be conveniently set at an orientation anywhere from 0 to 360° regardless of the orientation of polarization axis of the first linear polarizer 205.

In FIG. 8, a gap is shown between the first and second circularly polarizing retarders 260 and 840. An element such as a touch screen panel, an EMI shield, an IR blocker, or a heater may be disposed in this gap. As discussed more fully below, such elements can introduce substantial backreflections. The second circularly polarizing retarder 840 reduces the reflection from these elements and the first circularly polarizing retarder 260 increases the transmission of LCD light through the second circularly polarizing retarder 840, thereby enhancing the brightness and contrast of the display. How the second circularly polarizing retarder 840 reduces this back reflection and how the first circularly polarizing retarder 260 increases the transmission of LCD light through the second circularly polarizing retarder 840 are discussed more fully below.

To better understand the operation of the first and second circularly polarizing retarders 260 and 840 in the NLP-LCD shell structure, propagation of a light wave through retardation plates between two linear polarizers is discussed with reference to FIGS. 9A-9C. In particular, FIGS. 9A-9C are schematic diagrams of light propagating between two linear polarizers with various retarder layers disposed therebetween. The emitted light beam is marked as 901 and the light propagation direction is indicated as 930.

In arrangement 900 in FIG. 9A, there is only one quarter wave plate 205, with the slow axis indicated with a dotted line, between the two linear polarizers 206 and 807. The first linear polarizer 206 has a polarization axis, which selectively passes incident light 901 as the linearly polarized light wave 902. When light 902 passes the retardation plate 205, it is transformed into circularly polarized light 904, of which about 40~50% is selectively passed by the second linear polarizer 807. Accordingly, arrangements with odd number (2p+1) of quarter wave plates, where p is an integer, between the two linear polarizers 206 and 807 similarly allow at most 40~50% of the incident light 901 to be transmitted through the second linear polarizer 807 as arrangement 900, which is an example of such arrangements with p=0.

In arrangement 910 in FIG. 9B, two retardation plates are placed between linear polarizers 206 and 807. The first retardation plate 205 and the first linear polarizer 206 together form a circularly polarizing retarder 260 having a left-handed configuration. Light 901 is selectively passed by the first linear polarizer 206 and emerges from the first retardation plate 205 as left-handed circularly polarized light 904. The circularly polarized light 904 continues to propagate and pass through the second retardation plate 805, with the slow axis indicated by the dotted line. The light 904 is thereby converted into linearly polarized light 906 with the polarization perpendicular to the linearly polarized light 902. In order to pass the linearly polarized light 906, the polarization axis 911 of the second linear polarizer 807 is perpendicular to the polarization axis of the linear polarizer 206 as shown in arrangement 910. Such an arrangement makes the configuration of the second circularly polarizing plate 840 left-handed, which is the same configuration as the first circularly polarizing retarder 260 comprising the first linear polarizer 206 and first retardation plate 205.

FIG. 9C shows an arrangement 920 comprising four quarter-wave plates 205, 921, 922, and 805 between linear polarizers 206 and 807. Similarly, light wave 901 is circularly polarized after it passes through the first retardation plate 205 and emerges as circularly polarized light 904. The light wave 904 propagates through quarter wave plates 921, 922, and 805, which have their slow axes indicated by the dotted lines, and is converted into linearly polarized light 908. The linearly polarized light 908 has the same polarization as linearly polarized light 902. In order to pass linearly polarized light 908, the second linear polarizer 807 has the polarization axis 923 as shown. This configuration of the second circularly polarizing retarder 840, comprising the second retardation plate 805 and the second linear polarizer 807, is right-handed, which is reverse to the configuration of the first circularly polarizing retarder 260 comprising the first linear polarizer 206 and first retardation plate 205. Although not shown, when there are six quarter wave plates between the two linear polarizers 206 and 807, the configurations of the second and first circularly retarders 260, 840 should be the same (e.g., both left-handed) in order to pass substantial amount of 901.

It can be generalized that in order to have substantial transmission of light wave 901 from the first linear polarizer 206 through the second linear polarizer 807, an even number of quarter wave plates are arranged between two linear polarizers 206 and 807, producing a retardance of about 2pλ/4, where p is a positive integer. In the arrangements shown, the slow axes of the retarder plates are parallel. In certain embodiments, the slow axes of the retarder plates may be arranged with other orientations and result in an effective retardance of 2pλ/4, and still allow the efficient transmission of light 901 through 807. A retarder layer having effective retardance other than 2pλ/4, however, will allow transmission of 901 through 807 with less efficiency.

In addition to efficient transmission of light 901, it is also desirable to have a setup that can effectively prevent reflection of incident light from components in the display system. Illustration 960 in FIG. 9D shows how reflected light is reduced or minimized. As discussed below, if incident light 940 is circularly polarized light 980 when it reaches the reflective surface 950, the back reflection can be blocked. Thus, the retarder layer 990 forward of the reflective surface 950 may comprise an odd number of quarter wave plates, as discussed in FIG. 1, to produce circularly polarized light from linear polarized light. Likewise, if an even number of quarter wave plates is to be used between the linear polarizers 206 and 807 in the system, these quarter wave plates may be divided into sections forward and rearward of the reflective surface. The arrangement 910 in FIG. 9B shows two retarder layers with odd number of quarter wave plates in each layer, such as (2m+1)λ/4 and (2n+1)λ/4, where m and n are integers. The arrangement 910 contains two quarter wave plates, which are divided into two retarder layers, 205, 805 with m=0 and n=0, respectively. Each retarder layer 205, 805 forms with the respective first and second linear polarizers 206, 807, a circularly polarizing retarder 260 and 840 with left-handed configuration. Similarly, in FIG. 9C, arrangement 920 contains four quarter wave plates, which can be divided into two retarder layers using two different approached, with m=1 and n=0, or with m=0 and n=1. In either case, the resultant circularly polarizing retarders 260 and 840 have reverse configurations. Accordingly, It can be generalized that when (m+n) is 0 or an even integer, the configurations of the circularly polarizing retarders 260 and 840 are same with each other; and when (n+m) is an odd integer, the configurations of the circularly polarizing retarders 260 and 840 are reverse to each other.

Referring back to FIG. 8, the NLP-LCD shell structure 800 has two quarter wave plates 205, 805 between the first and second linear polarizers 206 and 807. The propagation of light 820 through the structure 800, therefore, is equivalent to the propagation of 901 in arrangement 910 of FIG. 9B. Accordingly, the configurations of the first and second circularly polarizing retarders 260 and 840 are the same (e.g., both left-handed or both right-handed) in certain preferred embodiments. For example, if the first circularly polarizing retarder 260 is right-handed, the polarization axis of the second linear polarizer 807 is set substantially at −45° to the slow axis of the second retarder layer 805, which makes the second circularly polarizing plate 840 right-handed. And if the first circularly polarizing plate 260 is left handed, the polarization axis of the second linear polarizer 807 is set substantially at 45° to the slow axis of the second retarder layer 805, which makes the second polarizing plate 840 left-handed. In such an arrangement, transmissive illumination 820 and reflective illumination 850 will propagate similarly to the light wave 901 of arrangement 910 in FIG. 9B, and can be efficiently delivered to viewer's eyes.

In certain embodiments, the orientation of the second linear polarizer 807 can be set freely at any angle from 0 to 360 degrees as discussed more fully below. This free rotation of the second linear polarizer can result in a display, e.g., a functional part integrated display, with convenient viewing zones for viewers wearing polarized sunglasses. As shown in FIG. 9B, the second circular retarder 840 can be rotated freely with respect to the first circular retarder 260. The second circular retarder 840 will in each case convert the circularly polarized light wave 904 into linearly polarized light 906. Accordingly, the second polarizer 807 can be oriented at any angle from 0 to 360 degrees.

The result is shown in FIGS. 10A-10D, which are schematic diagrams of the circular polarization generated by various orientations of the second circularly polarizing retarder 840 having a defined configuration of the second retardation plate 805 and the second linear polarizer 807. The NLP-LCD light output, for example, is a left-handed circularly polarized light 1011 in the illustrations. Viewed from the front side of the second linear polarizer looking towards LCD light source, the angle between the polarization axis 1001 of the second linear polarizer 807 to the slow axis 1002 of the second retardation plate 805 is defined as $\theta_2$. If $\theta_2$ increases from the polarization axis 1001 counterclockwise to the slow axis 1002, the angle is positive. On the other hand, if $\theta_2$ increases from the polarization axis 1001 clockwise to the slow axis 1002, the angle is negative. The second circularly polarizing retarder 840 has a left-handed configuration in the case where the transmission 1001 of the second linear polarizer 807 is about 45° with respect to the slow axis 1002 of the second retarder layer 805. The various orientations of the circularly polarizing plate 840 are illustrated as 1003, 1005, 1007 and 1009 in FIGS. 10A-10D, respectively. The circularly polarized light output 1004, 1006, 1008 and 1010 from the NLP-LCD in the illustrated embodiments having the corresponding orientations 1003, 1005, 1007, 1009 are each left-handed. Although not all shown, any rotation of the circularly polarizer 840, in the range of 0° to 360°, would invariably circularly polarize incident light thereby producing left-handed circularly polarized light as long as the configuration of the second linear polarizer 807 and the second retarder layer 805 is substantially maintained. Moreover, the light emitted with left-handed configuration from the rear side of second retarder plate 805 is transmitted by the second linear polarizer 807.

Accordingly embodiments such as shown in FIG. 8 may have the polarization axis of the second linear polarizer 807 set at any orientation from 0 to 360 degree with respect to the polarization axis of the first linear polarizer 206 without compromising transmission efficiency of LCD light. Out of the possible orientations for the polarization axis of the second linear polarizer 807, an orientation of about 90 degree is used in certain preferred embodiments. The advantage of setting the polarization axis at 90° can be understood from the following discussions.

FIGS. 11A and 11B schematically illustrate the apparent brightness as seen by a viewer wearing polarized sunglasses for different viewing zones of a display system that outputs linearly polarized light oriented at about 90° with respect to the horizontal. As shown in FIG. 11A, the display system 1100 has a 90° transmission direction 1101. The transmission direction 1101 forms various angles θ with the polarization axis 503 of viewer's polarized sunglasses depending to viewer's location. When the viewer 501 is in the most common straight front viewing position 1102, θ is about 0°, as shown in 1120 where most of LCD brightness will be seen. This area is marked as the bright area G1 in 1110 in FIG. 11B. For the same reason, area G2 is also a full brightness area. However, when viewer 501 moves to his or her left, as shown in 1103 in FIG. 11A, θ is about 45°, and the LCD will appear about one half as bright, as shown in 1130. This area is marked as the shaded area H1 in 1110 in FIG. 11B. For the same reason, areas H2, H3, and H4, the LCD also would appear to be about half as bright. Only when viewer 501 is at either side of the LCD, such as position 1104 in FIG. 11A, θ would be about 90° as shown in 1140, and little of the light from the LCD will be seen by the viewer. This area is marked as the dark area I1 in 1110 in FIG. 11B. For the same reason, area I2 would also appear dark. Thus, although with the edge viewing areas I1 and I2 being dark, the display system 1110 with a 90° transmission direction offers much more convenient viewing zones for outdoor viewers wearing polarized sunglasses when it is compared to a conventional display or polarized touch panel that has a light transmission direction of about 45°, 135°, or 0° as shown in FIG. 7.

Accordingly, it is advantageous to set the polarization axis of the second linear polarizer 807 (see FIG. 8) at about 90° for outdoor applications, especially for viewers wearing polarized sunglasses. In some embodiments, depending on the properties of the first and second retardation members 205 and 805 used, color distortion may sometime be observed due to the optical characteristics, such as inhomogeneity in retardation properties, of the retarders. Color correction, however, can be achieved by offsetting either angle $\theta_1$ between the first retarder layer 205 and the first linear polarizer 206 or angle $\theta_2$ between the second linear polarizer 807 and the second retarder layer 805. In various preferred embodiments, for example, the angle $\theta_1$ between the first retarder layer 205 and the first linear polarizer 206 is offset from ±45°. The amount of angle adjustment can be up to about ±20° with respect to ±45°. Similarly the angle $\theta_2$ between the second retarder layer 805 and the second linear polarizer 807 is offset from ±45°. The amount of angle adjustment can be up to about ±20° with respect to ±45°. Alternatively, an even number of quarter wave plates can be introduced between the first and second retarder layers 205 and 805 as color correcting sheets. Other configurations are also possible.

As discussed above, many outdoor electronic applications also might entail the addition of functional parts comprising highly reflective films, such as EMI shield (EMI), IR block (IR), LCD screen heater (heater), and resistive touch panel (RTP). The following discussions will demonstrate such functional parts can readily be incorporated in the NLP-LCD shell structure 800 (e.g., shown in FIG. 8) without introducing high reflections.

Figure 12:
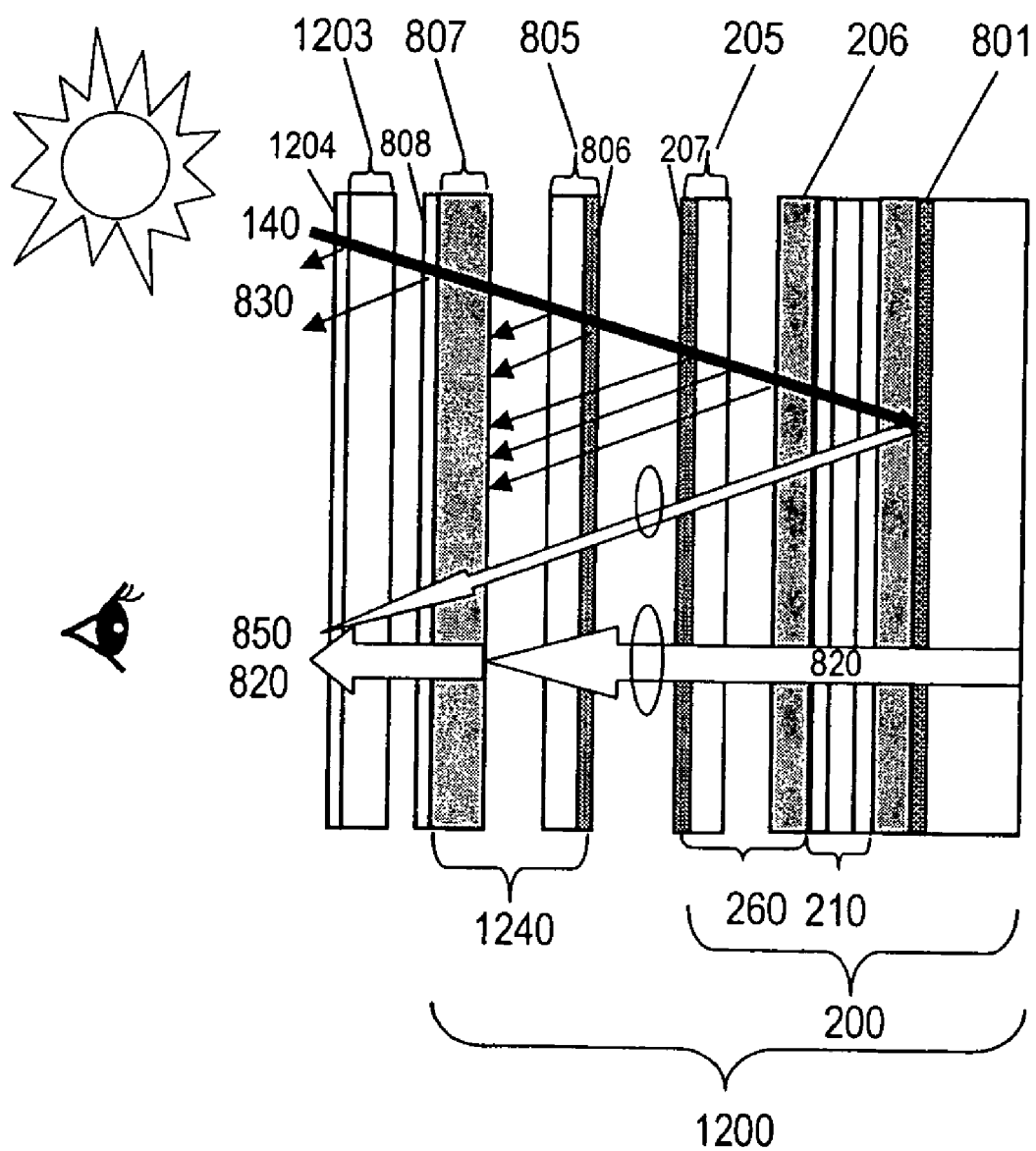
FIG. 12 is a schematic cross-sectional view of an NLP-LCD 1200 structure (such as shown in FIG. 8) integrated together with functional parts such as an EMI shield and IR blocker.

FIG. 12 is a diagram schematically illustrating an NLP-LCD 1200 structure integrated together with functional parts. Functional parts comprising conductive films can be easily incorporated into the NLP-LCD shell structure 800 (see FIG. 8) to form the NLP-LCD integrated structure 1200. Practically, EMI shielding and IR blocking (EMI/IR) can be integrated in a single sheet of transparent substrate coated with conductive film. To provide EMI shielding, the conductive film may be grounded. Screen heating and IR blocking functions (IR/heater) can also be achieved on a single sheet of transparent substrate coated with conductive film. The conductive film may also be electroded to provide current flow for resistive heating. In one embodiment, the IR blocker can also be a hot mirror coating comprising dielectric material and may comprise all dielectric material. The front surface 207 of the first retarder layer 205 and the rear surface 806 of the second retarder layer 805 can be used as the surfaces for conductive film coating to form the above mentioned functional parts. Thus, to incorporate either EMI/IR or/and IR/heater, a conductive film can be deposited on either or both surfaces 207 or 806. The conductive film may be deposited on the surface and may comprise, for example, ITO, ZnO, Ni, Cr, Au, $ZrO_2$, $TiO_2$, $SiO_2$, or $SnO_2$ having a conductivity in the range, e.g., of about 1 ohm to 1000 ohm per square, a transmission of about 50% to 95% in the visible range of about 400 nm to 700 nm, and a reflectance of about 20% to 90% for wavelengths about 700 nm and greater. Values outside these ranges are possible. The EMI/IR or IR/heater may be provided with proper electrodes or grounding setups as discussed above. For resistive touch panel integration, two conductive film coated substrates may be used, and the coating can be deposited on surfaces 806 and 207. The two coated surfaces are then equipped with proper electrodes and connectors, and laminated with a constant distance by dotted adhesive to make a touch sensitive input device. Various combinations are possible or alternatively only one functional part may be included. Integration of other functional parts is also possible.

The following examples illustrate that in such an arrangement, the reflections generated by the conductive film coated surfaces 806 and 207 are reduced by the second circularly polarizing plate 1240. Nevertheless, the LCD transmissive and transflective illuminations are effectively transmitted as discussed above.

Figure 13:
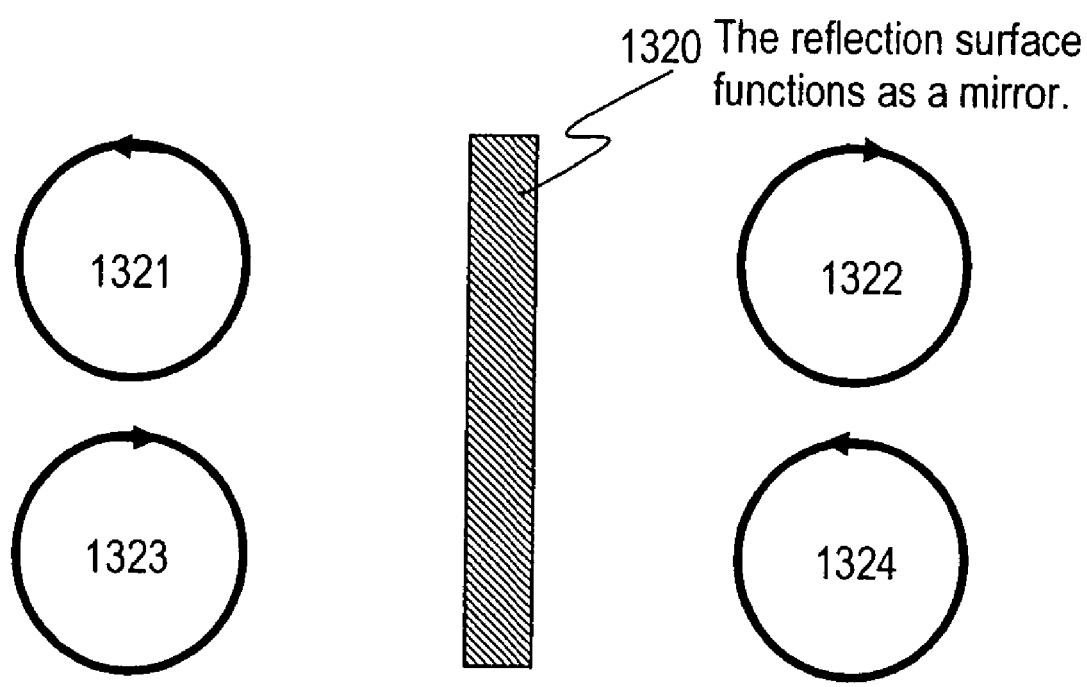
FIG. 13 is a schematic diagram illustrating the polarization change of a circular polarized light upon reflection.

FIG. 13 is a schematic diagram illustrating the polarization change of circular polarized light upon reflection. Circularly polarized light is reflected with reversed polarization. Left-handed circularly polarized light 1321 is reflected by a reflective surface 1320, which operates as a mirror, and converted into the right-handed circularly polarized light 1322. Right-handed circularly polarized light 1323 is reflected by the reflective surface 1320 and converted into left-handed circularly polarized light 1324 upon reflection.

Figure 14:
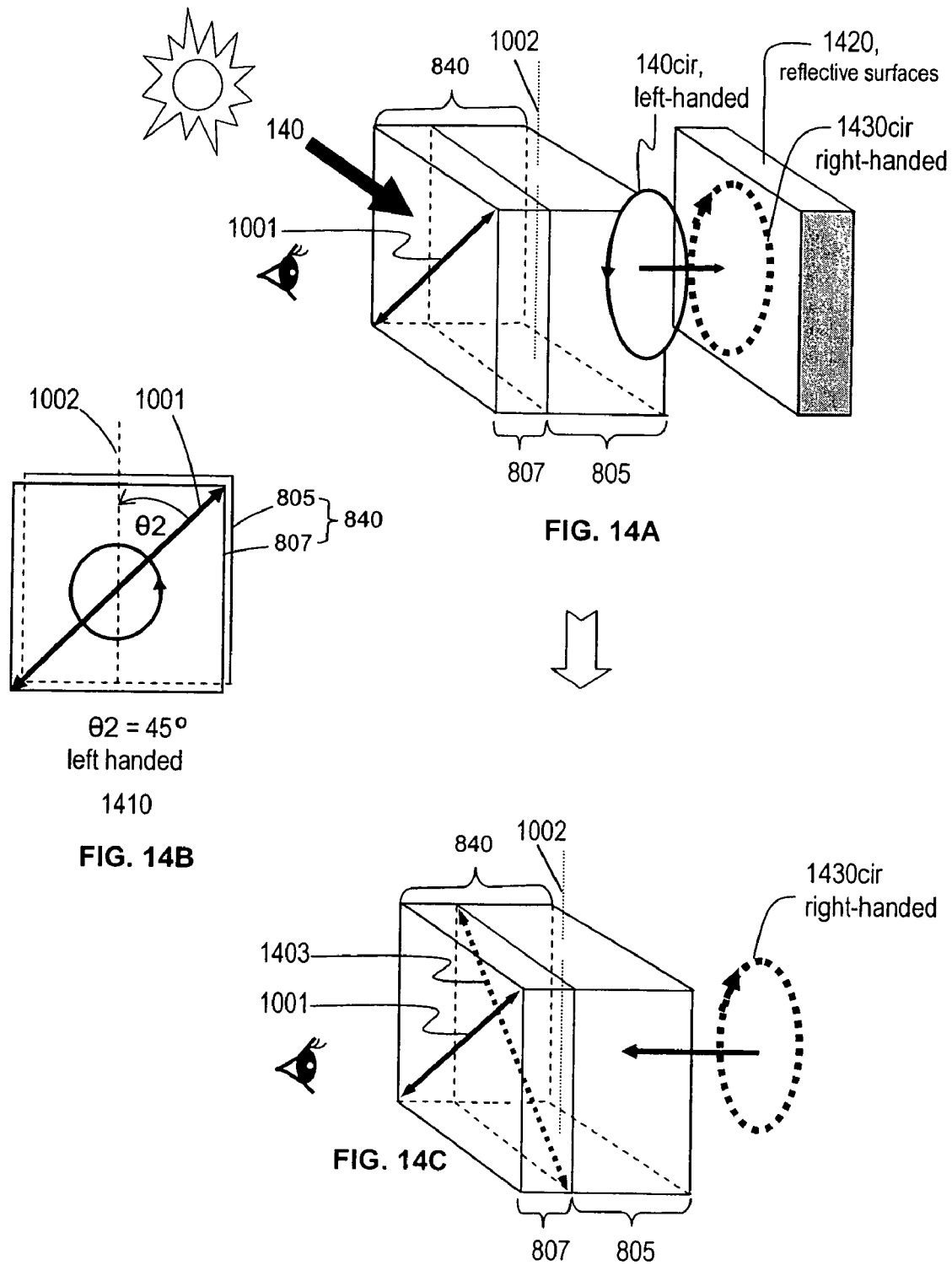
FIGS. 14A-14C are schematic illustrations showing how reflections from functional parts are reduced by the second circularly polarizing retarder.

FIG. 14A is an enlarged view around the second linear polarizer 807 of FIG. 12. As shown, the second linear polarizer 807 has a polarization axis 1001 and the second retarder layer 805 has a slow axis 1002. A front view is depicted in FIG. 14B. As seen from the perspective of the viewer, $\theta_2$ is about 45°. The incident sunlight 140 is linearly polarized by the second linear polarizer 807 and has a polarization parallel to the polarization axis 1001. The orientation of this linear polarization is about 45° with respect to the slow axis 1002 of the second retarder layer 805. The linear polarized light therefore emerges from the second retarder layer 805 as left-handed circularly polarized light 140*cir*. The circularly polarized light 140*cir* is reflected from the reflective conductive film coated surfaces (such as 806 and 207 in FIG. 12), which is collectively indicated as surface 1420. As shown in FIG. 14C, the right-handed polarized beams that are reflected are indicated as 1430*cir*. This right-handed polarized light 1430*cir* travels back to the second retarder layer 805 where the right-handed circularly polarized light is converted into a linearly polarized light with a polarization axis indicated by an arrow 1403. As shown, the polarization axis 1403 is perpendicular to the polarization axis 1001 of the second linear polarizer 807, and is thus not transmitted through the second linear polarizer 807. Thus, the reflected light beams 1403*cir* can be effectively blocked from viewer's eyes regardless of the number of conductive films in the system.

Referring now back to FIG. 12, the configurations of the first and the second circularly polarizing retarders 260 and 1240 are the same as previously discussed. The integrated NLP-LCD 1200, however, also has the advantage of being able to arbitrarily orient the polarization axis of the second linear polarizer 807, for example, such that the polarization axis is set to about 90°. As described above, this orientation provides more convenient viewing zones than other transmission directions for viewers wearing polarized sunglasses as discussed with reference to FIG. 11.

Additionally, a third retarder layer 1203 can be disposed forward of the second linear polarizer 807. The third retarder layer 1203 may comprise, for example, a quarter wave retarder having a retardance of about $(2k+1)\lambda/4$, where k is an integer and $\lambda$ is between about 400 nm-700 nm. This third retarder layer 1203 can be a single sheet retarder, a stack of laminated or loose sheets, or a film or multiple films. Additionally, this third retarder layer 1203 may comprise combinations of quarter wave plates, half wave plates, or full wave plates. In certain embodiments, the slow axis of the third retarder layer 1203 is at an angle substantially in the range of about 25° to 65° or –(25° to 65°), an may be at about 45° or –45° with respect to the polarization axis of the second linear polarizer 807. Addition of the third retarder layer 1203 converts the otherwise linearly polarized output of the integrated NLP-LCD 1200 to a non-linearly polarized transmission. As discussed above in connection with FIGS. 6A-6C and 7A-7B, a circularly or elliptically polarized output provides more homogeneity to a wide variety of viewing zones for viewers wearing polarized sunglasses. In certain embodiments, the rear surface of the third retarder layer can be laminated to or formed on the front surface of the second linear polarizer 807 with PSA. Quarter wave plates with $R/\lambda$ values in the in the range between curves 301 and 302, as shown in FIG. 3, can be used. For example, a quarter wave plate having an $R/\lambda$ value between about 0.216 and 0.315 at a wavelength of about 520 nm is employed. Half wave plates with $R/\lambda$ values in the range between curves 303 and 304 as shown in FIG. 3 can be used. For example, a half wave plate having an $R/\lambda$ value between about 0.432 and 0.630 at a wavelength of about 520 nm can be used. And full wave plates with $R/\lambda$ value in the range between curves 305 and 306 as shown in FIG. 3 can be employed. For example, a full wave plate having an $R/\lambda$ value between about 0.864 and 1.260 at a wavelength of about 520 nm can be used.

Still referring to FIG. 12, the front surface 808 of the second linear polarizer 807 or the front surface 1204 of the third retarder layer 1203 can comprise a high efficiency multi-layer anti-reflection coating. This coating may provide, for example, a reflection less than about 1.5%, and thus may reduce the surface reflection 830 and increase or maximize the entry of light beam 140 for reflective illumination 850. The front surface 808 of the second linear polarizer 807 or the front surface 1204 of the third retarder layer 1203 can also be a separate transmissive substrate comprising, for example, glass or plastic material, such as PET, PC, PEN, TAC, or ARTON etc. having its front surface coated with the high efficient multi-layer anti-reflection coating that provides a reflection less than about 1.5%. This separate transmissive substrate can have its rear surface bonded to the front surface of the second linear polarizer 807 or the front surface of the third retarder layer 1203 with index matching pressure sensitive adhesive (PSA). Other configurations are possible (for example, the anti-reflective coating may be located elsewhere).

The system discussed above conveniently utilizes the retarder layers 205, 805 as the substrate for conductive film coatings. It is possible to incorporate a separate functional part, including resistive touch panel, EMI, heater, and IR block, between the first and second retarder layers 205 and 807 and maintain good reflection control and efficient transmission. As discussed in further detail below, the first circularly polarizing retarder 260 rearward the reflective surfaces of conductive film is related to the transmission efficiency of LCD illumination and the second circularly polarizing retarder 1240 forward of the reflective surfaces of conductive film is related to the reflection prevention. Thus, the substantially circular polarizing retarder configuration of 1240 is preferred for effective reflection prevention. When an additional functional part is introduced between the first and second retarder layers 205 and 807 as described above, the added functional part can be considered as part of the first retarder layer 205 and the configuration of the second circularly polarizing retarder 1240 can be adjusted correspondingly. A substantially circular polarizing configuration of 260 is useful for efficient LCD illumination transmission. However, an integrated display system with angles other than about 45° or −45° between retarder 205 and linear polarizer 206 will still have satisfactory outdoor performances with a substantially circularly polarizing plate 1240 (see FIGS. 14A-14C).

Depending on the functional parts integrated, there may be 1-4 conductive films, and/or an all dielectric coated film (e.g. all dielectric coated film), for example, for IR block, included in a display functional parts integral system. More films may also be included. Thus, a polarized functional parts integral stack may be included as part of a STACK comprising for example at least one of a resistive touch panel, an EMI shield, an IR filter, and an LCD heater may be included. Other functional parts are also possible. Certain exemplary embodiments of the STACK may include three functional parts comprised of four conductive films, which may be coated on transparent substrates. Other embodiments of the STACK may include one to four of the above-mentioned functional parts comprised of about 1 to 5 films coated on sheets of transparent substrate. A retarder layer may be used as a substrate and may be part of the stack. More films, more substrates, and other combinations may also be employed.

Figure 15:
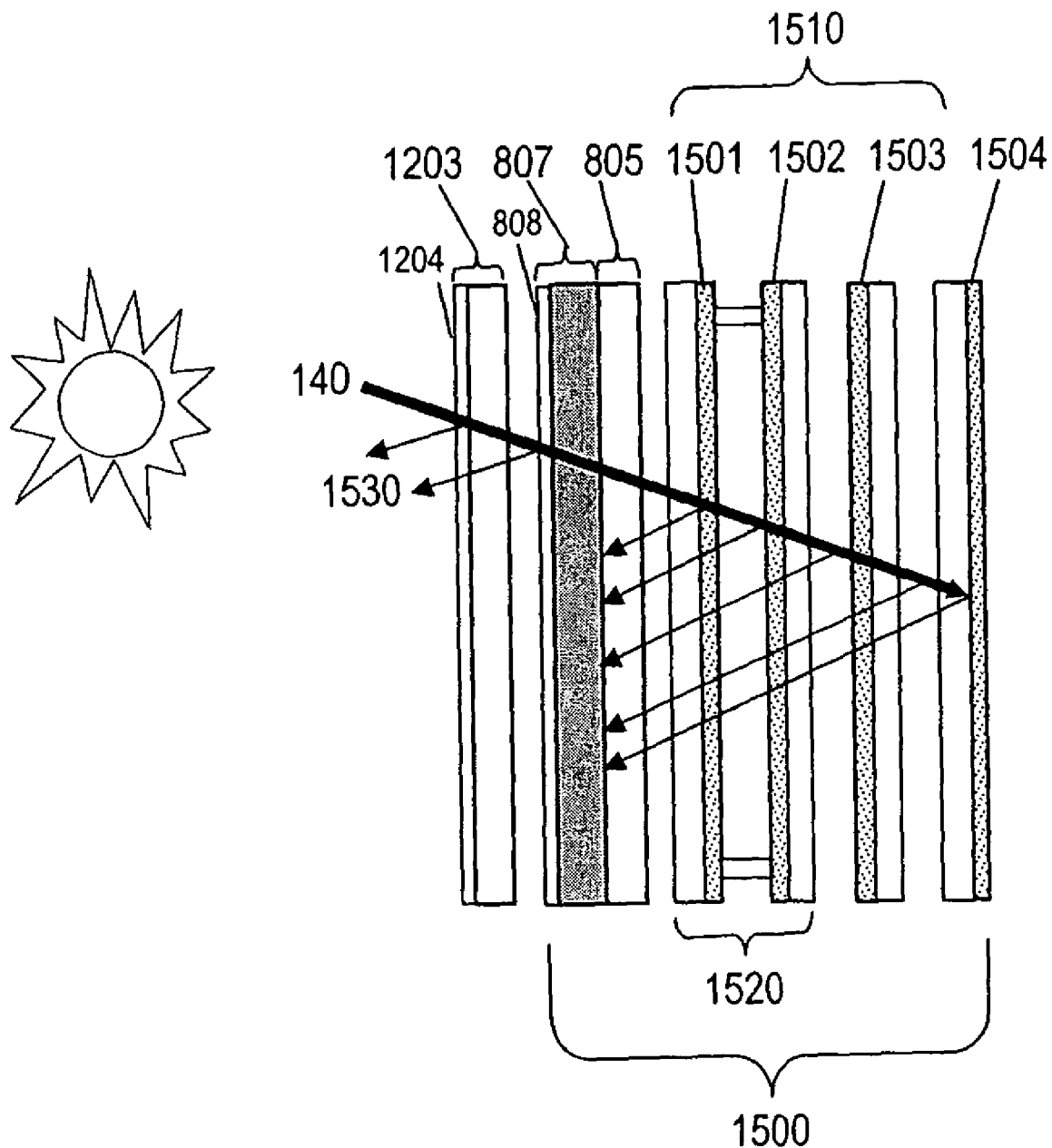
FIG. 15 is a schematic diagram showing a low reflection functional part structure comprising three functional parts.

With reference to FIG. 15, a diagram of a functional part structure includes three functional parts comprised of four coated transparent substrates is shown. In one exemplary embodiment shown, a STACK 1500 includes, with viewer's side as the front side, a transparent substrate stack 1510 comprising four sheet members, 1501, 1502, 1503, and 1504. Each sheet member has a front surface and a rear surface. The sheet members are transparent substrates and can be, for example, thin glass sheets, isotropic plastics, such as PET, PEN, TAC, PC, or ARTON etc. At least one surface of each sheet member is deposited with a conductor such as for example silver, ITO, ZnO, Ni, Cr, Au, $ZrO_2$, $TiO_2$, $SiO_2$, or $SnO_2$ to provide a conductivity in the range of about 1 ohm to 1000 ohm per square, a transmission of about 50% to 95% in the visible range of about 400 nm to 700 nm, and/or a reflectance of about 20% to 90% for wavelengths greater than about 700 nm. Other materials may be used and values outside these ranges are possible. Practically, when multiple functional parts are integrated together, the pressure sensitive touch panel can be located to the forward most side to assure the sensitivity to touch, and the transmissive screen heater can be formed closest to on LCD display to obtain optimal heating efficiency. Thus, the coated surfaces of sheets 1501 and 1502 containing electrodes are arranged to face each other, separated and laminated with a substantially constant distance by dotted adhesives, and made into a resistive touch panel 1520, which is a functional touch sensitive interface. Screen heater 1504 with proper heating electrodes setup can be laminated to the LCD with PSA. Sheet 1503 is utilized as an EMI shield and can be laminated to the rear surface of touch panel 1520 with the coated surface facing LCD for convenient grounding setup to LCD metal frame. Alternatively, sheet 1503 for the EMI shield can be laminated to the front surface of screen heater 1504 with proper grounding setup to LCD metal frame. More or less functional parts may be included and other configurations may be used.

Again referring to FIG. 15, the STACK 1500 also includes the second retarder layer 805 forward of the touch panel 1520. The second retarder layer 805 preferably is a quarter wave retarder having a retardance of about $(2n+1)\lambda/4$, where n is an integer and $\lambda$ is between about 400 nm-700 nm. As described above, the second retarder layer 805 may comprise a single sheet retarder or a stack of laminated or loose sheets or a film or multiple films. The second retarder layer 805 may comprise in combinations of quarter wave plates, half wave plates, or full wave plates. The rear surface of the second retarder layer 805 can be laminated to the front surface of the resistive touch panel 1520 with PSA. Quarter wave plates with R/$\lambda$ values in the range between curves 301 and 302, as shown in FIG. 3, can be used. For example, a quarter wave plate having an R/$\lambda$ value between about 0.216 and 0.315 at a wavelength 520 nm can be employed. Half wave plates with a R/$\lambda$ value in the range between curves 303 and 304 as shown in FIG. 3 can be used. For example, a half wave plate having an R/$\lambda$ value between about 0.432 and 0.630 at wavelength of about 520 nm can be employed. And full wave plates with R/$\lambda$ values in the range between curves 305 and 306 as shown in FIG. 3 can be used. For example, a full wave plate having an R/$\lambda$ value between about 0.864 and 1.260 at wavelength of about 520 nm. Other configurations and values outside these ranges are possible.

The STACK 1500 further includes the second linear polarizer 807 to the front side of the second retarder layer 805. The polarization axis of the second linear polarizer 807 is set substantially at an angle in the range of about ±(25°-65°), for example at about ±45°, with respect to the slow axis of the second retarder layer 805. In this arrangement, the second linear polarizer 807 would linearly polarize the incident sunlight 140. This linearly polarized sunlight propagates through the second retarder layer 805 where it is circularly polarized and reflected from surfaces 1501, 1502, 1503, and 1504, and also on the front surface of the display when the functional part stack is disposed on a liquid crystal display. However, the reflected light will have a reversed circular polarization, which is effectively blocked by the second linear polarizer 807 as discussed in connection with FIG. 14.

The orientation of the polarization axis of the second linear polarizer 807 can be set at 45° or 135° relative to the module. However, the STACK 1500 may also optionally further include a first retarder layer (not shown) in the back of the STACK. The orientation of the slow axis of the optional first retarder layer can be set at about 0 or 90 degree with respect to the module. These two orientations of slow axis would form an angle of ±45° to the most common light transmission directions, 45° or 135°, of a regular TFT LCD, which enables a particular STACK readily to be integrated with a regular LCD having linearly polarized illumination. In such an embodiment, the polarization axis of the second linear polarizer 807 may be set at any orientation relative to the module as discussed in connection with FIG. 10. For example, the second linear polarizer 807 can be oriented at an angle of about 90° with respect to the horizontal for providing convenient viewing zones to viewer wearing polarized sunglasses as previously discussed in FIG. 11.

Still referring to FIG. 15, it is also possible to further dispose a third retarder layer 1203 forward of the second linear polarizer 807. The third retarder layer 1203 may for example comprise a quarter wave retarder having a retardance of about $(2k+1)\lambda/4$, where k is an integer and $\lambda$ is between about 400 nm-700 nm. The third retarder layer 1203 may comprise a single sheet retarder or a stack of laminated or loose sheets or a film or multiple films. The third retarder layer may comprise combinations of quarter wave plates, half wave plates, or full wave plates. The rear surface of the third retarder layer 1203 can be laminated to the front surface of the second linear polarizer with PSA. The slow axis of the third retarder layer 1203 may be at an angle substantially in the range of about 25° to 65° or −(25° to 65°), for example about 45° or −45°, to the polarization axis of the second linear polarizer 807. Addition of the third retarder layer 1203 converts the otherwise linearly polarized transmission of the STACK 1500 to a circularly polarized transmission. One advantage of the circularly polarized output is that all around viewing zones is provided for viewers wearing polarized sunglasses as discussed in connection with FIGS. 6 and 7. Quarter wave plates with $R/\lambda$ values in the range between curves 301 and 302, as shown in FIG. 3, can be used. For example, a quarter wave plate having an $R/\lambda$ value between about 0.216 and 0.315 at a wavelength of about 520 nm can be employed. Half wave plates with $R/\lambda$ values in the range between curves 303 and 304 as shown in FIG. 3 can be used. For example, a half wave plate having an $R/\lambda$ value between about 0.432 and 0.630 at a wavelength of about 520 nm may be employed. And full wave plates with $R/\lambda$ values in the range between curves 305 and 306 as shown in FIG. 3 can be used. For example, a full wave plate having an $R/\lambda$ value between about 0.864 and 1.260 at a wavelength of about 520 nm can be employed. Values outside the ranges are possible and other configurations may be employed.

Further referring to FIG. 15, the front surface 808 of the second linear polarizer 807 or the front surface 1204 of the third retarder layer 1203 can comprise a high efficiency multi-layer anti-reflection (AR) coating, for example, providing a reflection of less than about 1.5%, to reduce the surface reflection 1530. The front surface 808 of the second linear polarizer 807 or the front surface 1204 of the third retarder layer 1203 can also be a separate transmissive substrate. This separate transmissive substrate may comprise, for example, glass or plastic material, such as PET, PC, PEN, TAC, or ARTON etc., and may have its front surface coated with the high efficient multi-layer anti-reflection coating, for example, that provides reflection less than about 1.5%. This separate transmissive substrate may have a rear surface bonded to the front surface of the second linear polarizer 807 or the front surface of the third retarder layer 1203 with index matching pressure sensitive adhesive (PSA). Values outside these ranges as well as other configurations are also possible (for example, the anti-reflective coating may be located elsewhere).

This arrangement of the functional part stack can be disposed to the front side of a regular LCD or an NLP-LCD 200. When the STACK is integrated with a regular LCD significant improvement on contrast under sunlight can be obtained. However, the brightness is about half of the original brightness. In the case of integration with an NLP-LCD 200, significant level of the display brightness is also maintained in addition to the effective reflection prevention function. Preferred embodiments of STACK 1500 integrated display systems 1600 and 1700 containing a touch functional part are shown in connection with the following discussions. In other embodiments, the STACK 1500 integrated displays may contain one or more the following functional parts: EMI shield, IR block, resistive touch panel, and LCD screen heater. Other components may also be included.

Figure 16:
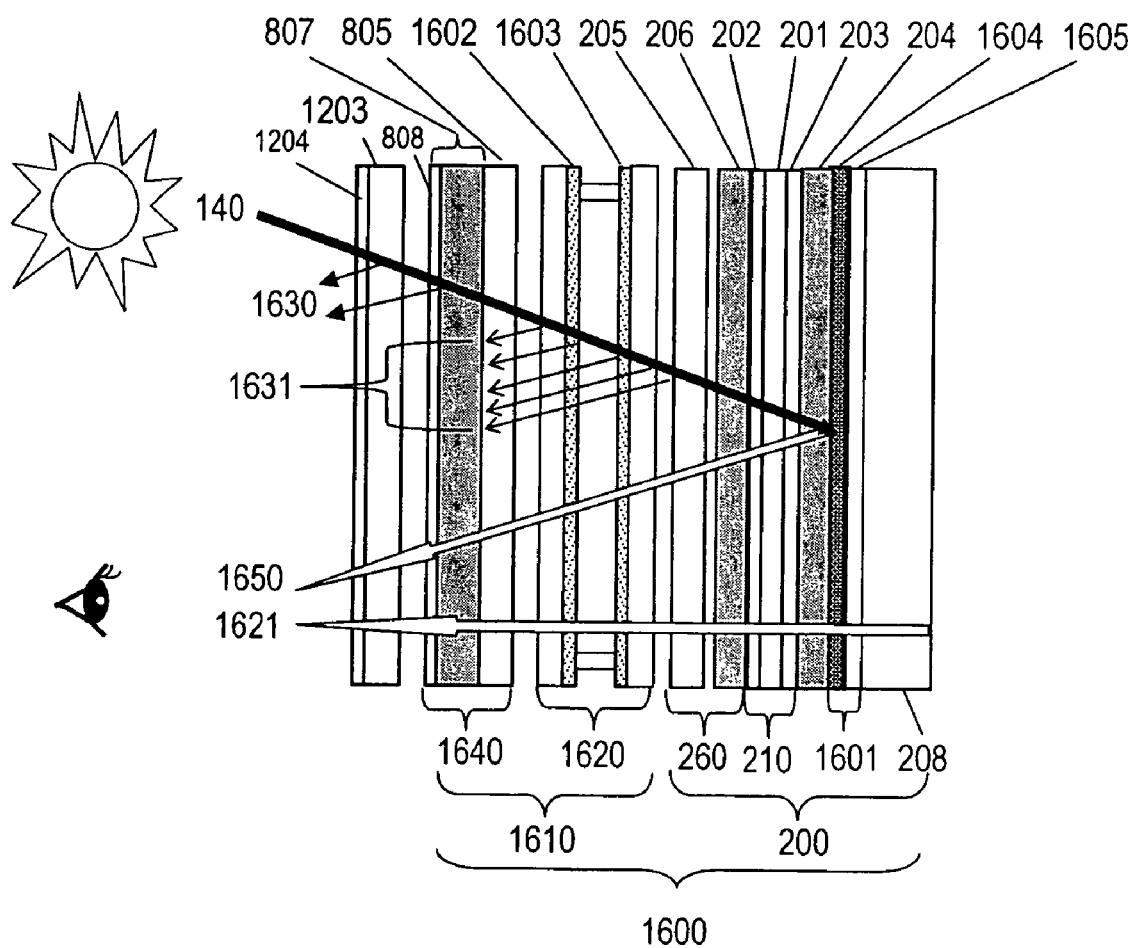
FIG. 16 is a schematic cross-sectional view of a polarized touch panel integrated together with a circularly polarized liquid crystal display.

FIG. 16 shows a polarized touch panel integrated together with a circularly polarized liquid crystal display. STACK-NLP-LCD 1600 (e.g. RT-TRIOLCD, from Advanced Link Photonics, Inc., Tustin, Calif.) comprises, with viewer's side as the front side, a liquid crystal cell 210, comprised of a liquid crystal layer 201 sandwiched between a front substrate 202 and an electrode containing rear substrate 203. The front substrate 202 may comprise a thin glass sheet comprising transparent electrodes, such as in a transmissive or transflective type of TFT liquid crystal display. The front substrate 202 may also comprise a thin glass sheet with a stack of transparent retardation compensator plates having a surface coated with transparent electrodes, such as in a reflective, transflective, or transmissive type of TN/STN liquid crystal display. STACK-NLP-LCD 1600 (e.g., RT-TRIOLCD) can also include a rear polarizer 204 and a backlight module 208 at the rear side of liquid crystal cell 210. The backlight module 208 may comprise a high efficiency transmissive backlight cell assembly comprising sheets of brightness enhancement films and other polymeric films for enhancing light transmission and optical performances. However, any conventional backlight cell or high brightness backlight cell with edge or backside lamps can be used. Other backlight cells are also possible. The backlight module 208 can also be a transflective or reflective type of light device with a transflector or a reflector. The transflector or the reflector can be the reflective electrodes (not shown) deposited on the front surface of the rear substrate 203, or a sheet member 1601 with transflective or reflective properties positioned on the rear side of the liquid crystal layer 201.

In one embodiment, the sheet member 1601 can just be a reflective polarizer, which can be laminated to the rear surface of the linear polarizer 204 to form an integral. In other embodiments, the sheet member 1601 is comprised of a diffusing element or structure 1604 and a reflective polarizer 1605. The reflective polarizer 1605 may absorb less than about 10% of incident the light energy. The reflective polarizer 1605 may also have an extinction coefficient, defined as the transmission of the p state polarization over the transmission of the s state polarization, ranging from about 1.5 to 9, for example. In addition, the polarization axis of the reflective polarizer 1605 may be parallel to or within about (+/−) 60 degrees in relation to the polarization axis of the rear polarizer 204 in some embodiments. The rear polarizer 204 and the reflective polarizer 1605 can be formed as an integral by being laminated. It is also possible that in some embodiments the reflective polarizer is used as the rear polarizer 204.

The reflective polarizer 1605 can be formed with multiple sheets of a selective reflective polarizer with optimized polarization axes. The reflective polarizer 1605 can also be a diffuser laminated selective reflective polarizer. The diffusing element 1604 may be a corrugated diffusing surface with haze in the range of about 10% to 85% in some embodiments. The corrugated surface can be a roughened surface on the rear surface of the rear polarizer 204 or on a separate transmissive polymeric substrate, such as PET, PC, PEN, TAC, or ARTON etc. The corrugated surface can also be a dielectric or other material and may comprise, e.g., $TiO_2$, $Ta_2O_5$, $SiO_2$, SiN, ITO, ZnS, $Al_2O_3$, $LaF_3$, $MgF_2$, Ge, or Si, deposited on the rear surface of the rear polarizer 204, or on a separate sheet of transmissive substrate. The corrugated surface may comprise small metal particles, ranging in size from about 10 nm to 10000 nm, deposited on the rear surface of the rear polarizer 204 or on a separate sheet transmissive substrate. The choice of the metal includes, for example, silver, gold, aluminum, copper, titanium, tantalum, chromium, nickel or an alloy thereof. One or more sheets of lose-packed or optically bonded transmissive substrate with the corrugated surface can make up the diffusing element 1604. In addition, diffusing element 1604 can be optically bonded to the rear surface of the rear polarizer 204 or/and to the front surface of the reflective polarizer 1605. The diffusing element can also be a layer of adhesive material, which bonds the rear polarizer 204 and the reflective polarizer 1605 and comprises dispersed particles such that the haze value of the layer is in the range of about 10% to 85% in some embodiments. In other embodiments such as described herein where a diffuser is utilized, an adhesive material comprising diffusing particles may be used. This adhesive material comprising diffusing particles can diffuse the light. In certain embodiments, the diffusing adhesive has a haze value in the range of about 10% to 85% as described above. Values outside these ranges as well as different configurations both well known as well as those yet devised are possible. Other types of diffusing structures may also be used and may be located elsewhere.

With continued reference to FIG. 16, the STACK-NLP-LCD 1600 (e.g. RT-TRIOLCD, from Advanced Link Photonics, Inc., Tustin, Calif.) can also include a first linear polarizer 206, which can be bonded to the front surface of the liquid crystal cell 210 to form an integrated display module. The STACK-NLP-LCD 1600 (e.g. RT-TRIOLCD) can further include a first retarder layer 205 to the front side of the first linear polarizer 206. The first retarder layer 205 may comprise a quarter wave retarder having a retardance of about $(2m+1)\lambda/4$, where m is an integer and $\lambda$ is between about 400 nm-700 nm. The first retarder layer 205 may comprise a single sheet retarder or a stack of laminated or loose sheets or a film or multiple films. The first retarder layer 205 may comprise quarter wave plates, half wave plates, or full wave plates. The rear surface of the first retarder layer 205 can be laminated to the front surface of the first linear polarizer 206 with an index-matched pressure sensitive adhesive (PSA) to form a first circularly polarizing retarder 260 as a part of display. Quarter wave plates with R/A values in the range between curves 301 and 302, as shown in FIG. 3, can be used. For example, a quarter wave plate having an R/$\lambda$ value between about 0.216 and 0.315 at a wavelength of about 520 nm may be employed. Half wave plates with R/$\lambda$ values in the range between curves 303 and 304 as shown in FIG. 3 can be used. For example, a half wave plate of R/$\lambda$ value between about 0.432 and 0.630 at a wavelength of about 520 nm may be employed. And full wave plates with R/$\lambda$ values in the range between curves 305 and 306 as shown in FIG. 3 can be used. For example, a full wave plate having R/$\lambda$ values between about 0.864 and 1.260 at a wavelength of about 520 nm may be employed.

The slow axis of the first retarder layer 205 may be set at an angle $\theta_1$ in the range of about 25° to 65° or –(25° to 65°), for example at about 45° or –45°, with respect to the polarization axis of the first linear polarizer 206. While viewed from the front side of the retardation plate 205 looking towards the LCD light source, as shown in FIG. 4, if the angle $\theta_1$ is substantially 450, the configuration of the first circularly polarizing plate 260 is left-handed. If the angle $\theta_1$ is substantially –45°, the configuration of the first circularly polarizing plate 260 is right-handed. Other values outside these ranges may be used.

Further referring to FIG. 16, the STACK-NLP-LCD 1600 (e.g. RT-TRIOLCD, from Advanced Link Photonics, Inc., Tustin, Calif.) also includes a STACK 1610 comprising, from the front side to the rear side, a second linear polarizer 807 having a front surface 808, a second retarder layer 805, and a resistive type touch panel 1620. The second retarder layer 805 may comprise a quarter wave retarder having a retardance of about $(2n+1)\lambda/4$, where n is an integer and $\lambda$ is between about 400 nm-700 nm. The second retarder layer may comprise a single sheet retarder or a stack of laminated or loose sheets or a film or multiple films. The second retarder layer may comprise quarter wave plates, half wave plates, or full wave plates. Quarter wave plates with R/$\lambda$ values in the range between curves 301 and 302, as shown in FIG. 3, can be used. For example, a quarter wave plate having an R/$\lambda$ value between about 0.216 and 0.315 at a wavelength of about 520 nm may be employed. Half wave plates with R/$\lambda$ values in the range between curves 303 and 304 as shown in FIG. 3 can be used. For example, a half wave plate having an R/$\lambda$ value between about 0.432 and 0.630 at a wavelength of about 520 nm may be employed. And full wave plates with R/$\lambda$ values in the range between curves 305 and 306 as shown in FIG. 3 can be used. For example, a full wave plate having an R/$\lambda$ value between about 0.864 and 1.260 at a wavelength of about 520 nm can be employed.

In certain embodiments, the rear surface of the second retarder layer 805 can be laminated to the front surface of the resistive touch panel 1620 with an index-matched pressure sensitive adhesive (PSA). Additionally, the front surface of the second retarder layer 805 can be laminated to the rear surface of the second linear polarizer 807.

The polarization axis of the second linear polarizer 807 may be set at an angle $\theta_2$ in the range of about ±(25°-65°), for example at about ±45°, to the slow axis of the second retarder layer 805 forming the second circular polarizer 1640. This second circular retarder effectively reduces or prevents the reflections from the reflective surfaces 1602, 1603, and the front surface of 205. However, as previously disclosed, the polarization axis of the second linear polarizer 807 can be conveniently set at an angle in the range of 0 to 360° regardless the orientation of the polarization axis of the first linear polarizer 205.

Figure 9:
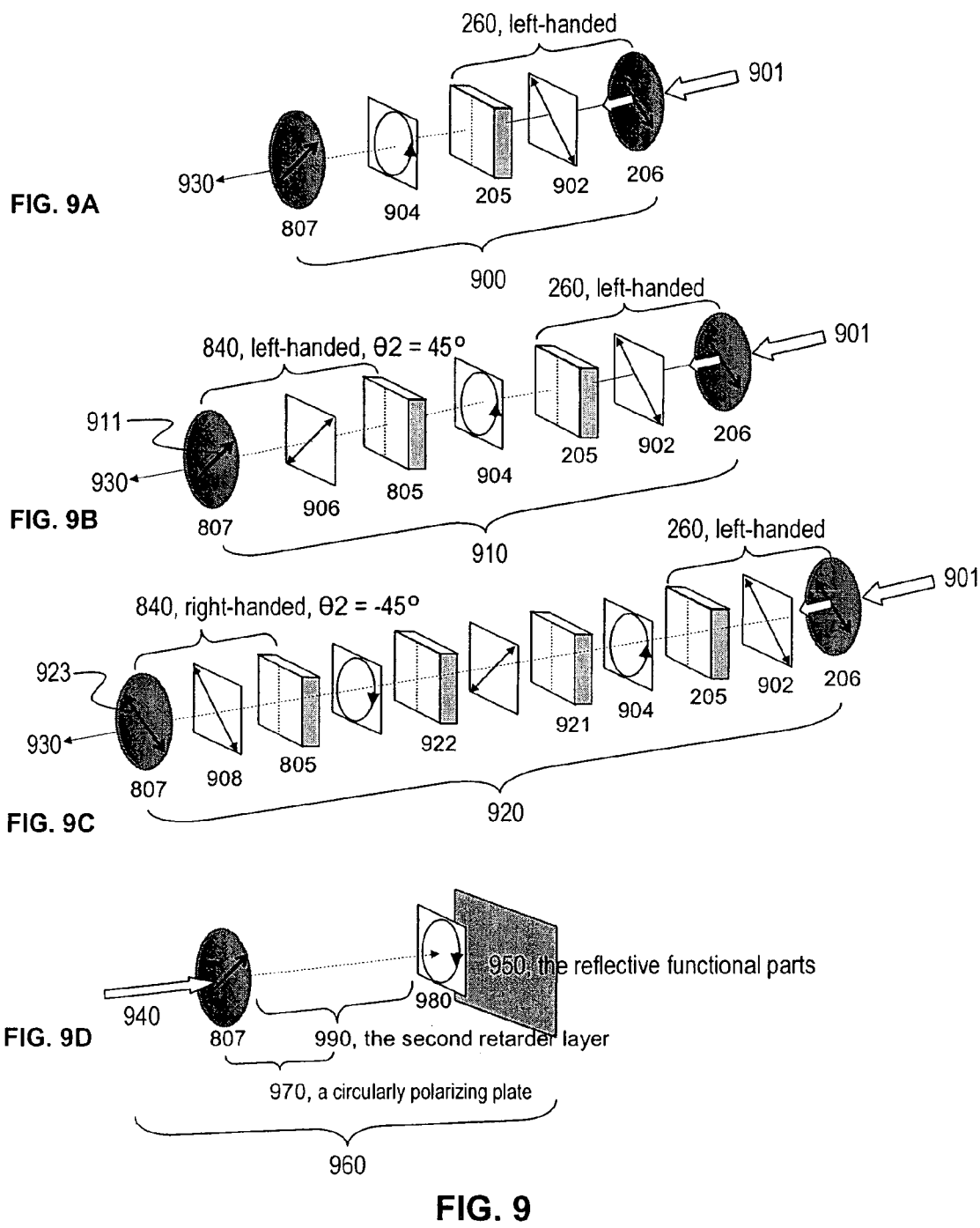
FIGS. 9A-9C are schematic diagrams of light propagating between two linear polarizers with various retarder layers disposed therebetween.
FIG. 9D is a schematic diagram that shows how reflection of incident light from surfaces in the display is reduced or minimized by using circularly polarized light.
Figure 10:
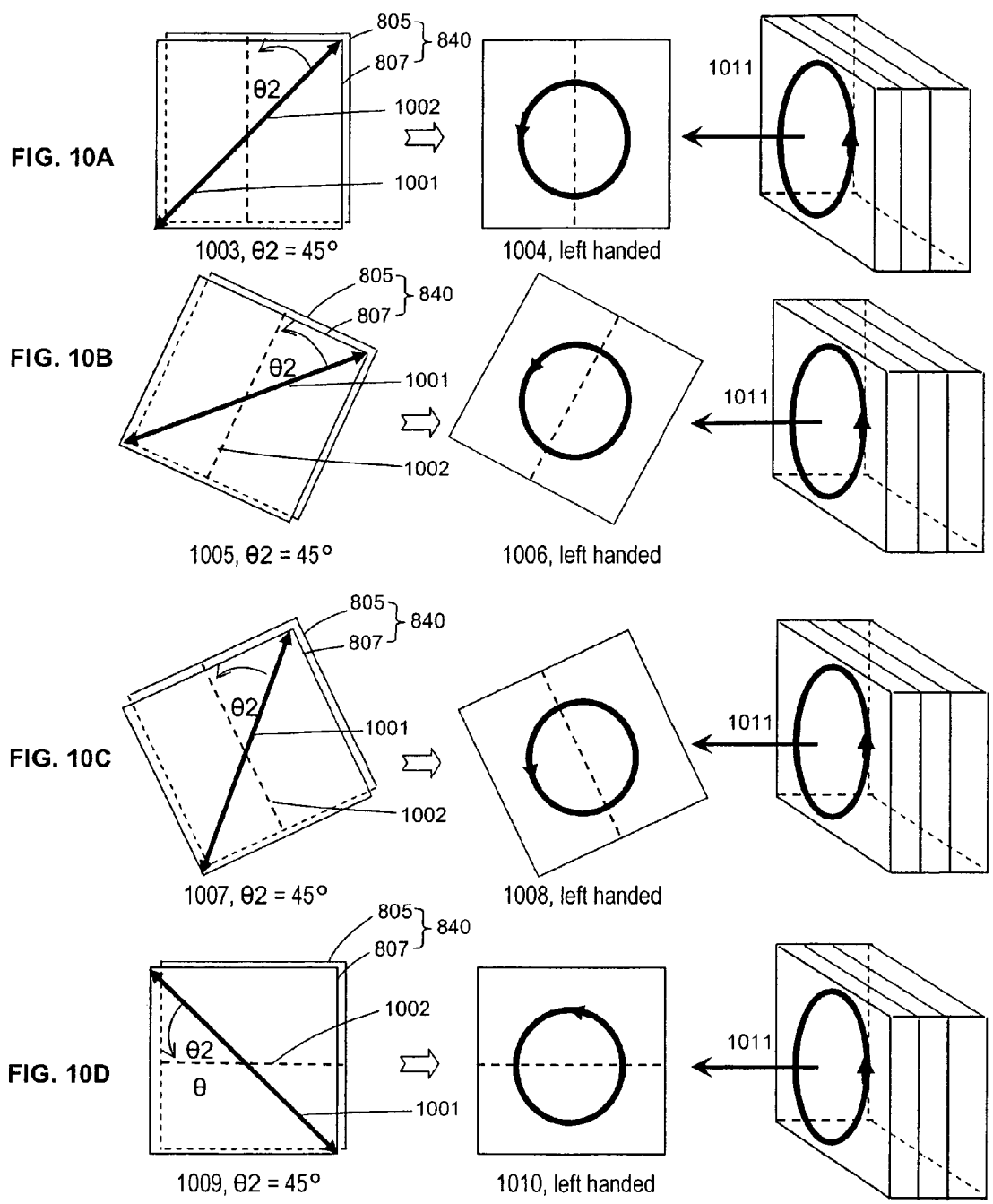
FIGS. 10A-10D are schematic diagrams of circularly polarized light generated by various orientations of the second circularly polarizing retarder.

As briefly discussed with reference to FIG. 9, the relative configurations of the second and first circular retarders 840 and 260 may be determined by retardance of the two retarder layers, $(2m+1)\lambda/4$ for 205 and $(2n+1)\lambda/4$ for 807, where n and m are integers and $\lambda$ is about 400 nm-700 nm. When (n+m) is 0 or an even integer, the configuration of the first and second circular retarders 260 and 840 are the same (e.g. both left-handed or both right-handed). If (n+m) is an odd integer, the configurations of the second and first circularly polarizers 840 and 260 are to be reverse to each other. Other values outside these ranges may also be used.

With reference back to FIG. 16, to determine the corresponding configurations of the first and second circular retarders 260 and 1640 in the STACK-NLP-LCD 1600 (e.g. RT-TRIOLCD), the retardance of the functional part(s), in this example a resistive touch panel, may be taken into consideration. In certain embodiments, the resistive touch panel is made of thin glass sheets or isotropic plastic sheets, such as PET, PEN, TAC, PC, ARTON, etc., with minimum retardation properties, for example with retardance less than about 80 nm. In such embodiments with (n+m) being 0 or an even integer, the propagation of LCD illumination 1621 is substantially equivalent to the propagation of the light 901 in the arrangement 910 of FIG. 9. Accordingly, the configurations of the first and second circular polarizers 260 and 1640 can be determined to be the same as each other (e.g., both right-handed or both left-handed). That is to say, if the first circular retarder 260 is right-handed with $\theta_1$ being substantially −45° as shown in 420 of FIG. 4B, the polarization axis of the second linear polarizer 807 is set such that the angle from the polarization axis of the second linear polarizer to the slow axis of the second retarder layer 805 is substantially at −45°, which makes the second circular retarder 1640 right-handed. And if the first circular retarder 260 is left-handed with $\theta_1$ being substantially 45° as shown in 410 of FIG. 4A, the polarization axis of the second linear polarizer 807 is set such that the angle from the polarization axis of the second linear polarizer to the slow axis of the second retarder layer 805 is substantially at 45° to the slow axis of the second retarder layer 805, which makes the second circular retarder left-handed.

On the other hand, if (n+m) is an odd integer and the retardance of the functional parts is not significant, the configurations of the first and second circular polarizers 260 and 1640 can be determined to be opposite as each other (e.g., one right-handed and one left-handed, like in FIG. 9C). That is to say, if the first circular retarder 260 is left-handed with $\theta_1$ being substantially 45° as shown in 410 of FIG. 4A, the polarization axis of the second linear polarizer 807 is set such that the angle from the polarization axis of the second linear polarizer to the slow axis of the second retarder layer 805 is substantially at −45°, which makes the second circular retarder 1640 right-handed. And if the first circular retarder 260 is right-handed with a, being substantially −45° as shown in 420 of FIG. 4B, the polarization axis of the second linear polarizer 807 is set such that the angle from the polarization axis of the second linear polarizer to the slow axis of the second retarder layer 805 is substantially at 45° to the slow axis of the second retarder layer 805, which makes the second circular retarder left-handed.

In some other embodiments, the functional parts may contain significant retardance. The retardance of the functional parts may be integrated as a part of the first retarder layer retardance, which may be adjusted to obtain an effective retardance of about (2m +1)λ/4. The configurations of the first and second circular retarders 260 and 1640 may be determined accordingly. Thus, efficient delivery of both reflective illumination 1650 and transmissive illumination 1621 to viewer's eyes can be achieved.

In various preferred embodiments, an air gap between components creates two air-material interfaces, which cause reflections due to index mismatch. These reflections may interfere and compromise the optical performances of the integral. The air-material interfaces can be eliminated by laminating the separate parts together and removing the air gap therebetween. However, adequately applying anti-reflection treatment or incorporating diffusing property on surfaces can also conveniently reduce undesirable backreflections and the resultant interference and enhance the optical properties of the integral. For example, if the rear surface of the first retarder layer 205 is laminated to the front surface of the first linear polarizer 206 to form an integrated display module as described in FIG. 2, an anti-reflection treatment (not shown) can be disposed on the front surface of the first retarder layer 205 or the rear surface of the touch panel 1620, or the front surface of the first retarder layer 205 can include a diffusing property or structure (not shown) to curtail or prevent interference of the reflections and enhance the optical properties. The diffusing structure (not shown) can be a roughened surface or may comprise particles (as discussed in previous section) deposited on the front surface of the first retarder layer 205. In certain embodiments, the diffusing structure may comprise a laminated sheet member (not shown) with diffusing property of Haze value greater than zero. However, in other embodiments, the front surface of the first retarder layer 205 is laminated to the rear surface of the touch panel 1620. In such embodiments, an anti-reflection treatment (not shown) or diffusing structure may be disposed on at least one of the rear surface of the first retarder layer 205 and on the front surface of the first linear polarizer 206 to achieve the equivalent optical performances. Different types of diffusing structures may be used and other configurations are possible (for example, the diffusing structure and/or anti-reflective coating may be located elsewhere).

Still referring to FIG.16, as discussed above, the polarization axis of the second linear polarizer 807 can be conveniently set at any orientation in the range of 0 to 360 degrees, e.g., at 90 degrees to the horizontal, regardless the orientation of the polarization axis of the first linear polarizer 206. At least two advantages result. First, setting the polarization axis at 90 degrees provides a cost saving in production. A linear polarizer is a relatively expensive raw material. A regular polarized touch screen is usually made with 45° or 135° light in order to match up with the light transmission direction of a regular LCD, in which the sheet of linear polarizer will need to be cut diagonally. In one embodiment, there is no need to restrict the orientation of the polarization axis of the second linear polarizer 807, and the polarizer sheet can be cut in any way, whichever is cost beneficial. Second, a 90° transmission direction can provide convenient viewing zones for viewers wearing sunglasses as discussed in connection with FIG. 11.

In some arrangements, depending on the properties of the first and second retarder layers 205 and 805 used, color distortion may sometime be observed. The color correction can be achieved by offsetting either angle $\theta_1$ between the first retarder layer 205 and the first linear polarizer 206, or angle $\theta_2$ between the second linear polarizer 807 and the second retarder layer 805. For example, angle $\theta_1$ may be offset. The amount of angle adjustment can be within about ±20° off the ±45°. In other embodiments, 2n equivalent quarter wave plates, n being an integer, can be introduced between the first retarder layer 205 and the touch panel 1620 as color correcting sheets (not shown). With proper arrangement of the optical axes among the plates, satisfactory color corrections can be obtained. In one embodiment, depending on the equivalent retardance of the plates introduced for the color correction, configurations of the first and second circularly polarizers 260 and 1640 may need to be adjusted according to the discussion presented above in connection with FIG. 9.

Still referring to FIG. 16, the advantage of being able to deliver convenient viewing zones for viewers wearing polarized sunglasses can also be achieved by further disposing a third retarder layer 1203 to the front side of the second linear polarizer 807 as described above. The third retarder layer 1203 may comprise a quarter wave retarder having a retardance of about (2k+1)λ/4, where k an integer and λ is about 400 nm-700 nm. The third retarder layer 1203 may comprise a single sheet retarder or a stack of laminated or loose sheets or a film or multiple films. The third retarder layer 1203 may comprise quarter wave plates, half wave plates, or full wave plates. The third retarder layer 1203 converts the otherwise linearly polarized transmission 1621 to a circularly polarized transmission. The advantage of the effect can be similarly understood with reference to discussions of FIGS. 6 and 7. The front surface 808 of the second linear polarizer 807 or the front surface 1204 of the third retarder layer 1203 may comprise a highly efficient multi-layer anti-reflection coating, for example, having reflection less than about 1.5% to reduce or prevent the surface reflection 1630 and to increase or maximize the entry of light beam 140 for reflective illumination 1650. In some embodiments, the front surface 808 of the second linear polarizer 807 or the front surface 1204 of the third retarder layer 1203 can also comprise a separate transmissive substrate, e.g., glass or plastic, such as PET, PEN, TAC, PC, ARTON, with its front surface being coated with the high efficient multi-layer anti-reflection coating, for example, providing reflection less than about 1.5%. The rear surface of the separate transmissive substrate can be bonded to the front surface of the second linear polarizer 807 or the front surface of the third retarder layer 1203 with index matching pressure sensitive adhesive (PSA). Combination of reduction or minimization of reflections, 1630 and 1631, and increase or maximization of LCD illuminations, 1621 and 1650, in this embodiment, is sufficient to make the STACK-NLP-LCD 1600 (e.g. RT-TRIOLCD) direct sunlight readable. Values outside the ranges provided above and other configurations may be employed (for example, the anti-reflective coating may be located elsewhere).

FIG. 17A shows a polarized touch panel integrated together with an alternative circularly polarized liquid crystal display. Resistive touch panel integral 1700 (e.g. RT-TRIOLCD, Advanced Link Photonics, Inc., Tustin, Calif.) comprises, with viewer's side as the front side, a liquid crystal cell 210, comprised of a liquid crystal layer 201 sandwiched between a front substrate 202 and an electrode containing rear substrate 203. The front substrate 202 may comprise a thin glass sheet comprising transparent electrodes, such as in a transmissive or transflective type of TFT liquid crystal display. The front substrate 202 may also comprise a thin glass sheet with a stack of transparent retardation compensator plates having a surface coated with transparent electrodes, such as in a reflective, transflective, or transmissive type of TN/STN liquid crystal display. Resistive touch panel integral 1700 (e.g., RT-TRIOLCD) can also include a backlight module 208 at the rear side of liquid crystal cell 210. The backlight module 208 may comprise a high efficiency transmissive backlight cell assembly comprising sheets of brightness enhancement films and other polymeric films for enhancing light transmission and optical performances. However, any conventional backlight cell or high brightness backlight cell which may have edge or backside lamps can be used. Other backlight cells are also possible. The backlight module 208 can also be a transflective or reflective type of light device with a transflector or a reflector. The transflector or the reflector can be the reflective electrodes (not shown) deposited on the front surface of the rear substrate 203, or a sheet member 1701 with transflective or reflective properties positioned on the rear side of the liquid crystal layer 201. The resistive touch panel integral 1700 (e.g. RT-TRIOLCD) can further include a first linear polarizer 206 bonded to the rear surface of the liquid crystal cell 210.

In one embodiment, the sheet member 1701 can just be a reflective polarizer, which can be laminated to the rear surface of the linear polarizer 206 to form an integral. In other embodiments, the sheet member 1701 is comprised of a diffusing element or structure 1704 and a reflective polarizer 1705. The reflective polarizer 1705 may absorb less than about 10% of the incident light energy in some embodiments. The reflective polarizer 1705 may also have an extinction coefficient, defined as the transmission of the p state polarization over the transmission of the s state polarization, ranging from about 1.5 to 9, for example. In addition, the polarization axis of the reflective polarizer 1705 may be parallel to or within about (+/−) 60 degrees in relation to the polarization axis of the first linear polarizer 206 in some embodiments. The first linear polarizer 206 and the reflective polarizer 1705 can be formed as an integral by being laminated. It is also possible that in some embodiments, the reflective polarizer 1705 is used as the first linear polarizer 206.

The reflective polarizer 1705 can be formed with multiple sheets of a selective reflective polarizer with optimized polarization axes. The reflective polarizer 1705 can also be a reflective polarizer that comprises a diffuser laminated thereto. The diffusing element or structure 1704 may be a corrugated diffusing surface with haze in the range of about 10% to 85% in some embodiments. The corrugated surface can be a roughened surface on the rear surface of the first linear polarizer 206 or on a separate transmissive polymeric substrate, such as PET, PC, PEN, TAC, or ARTON etc. The corrugated surface can also be a dielectric or other material and may comprise, e.g., $TiO_2$, $Ta_2O_5$, $SiO_2$, SiN, ITO, ZnS, $Al_2O_3$, $LaF_3$, $MgF_2$, Ge, or Si deposited on the rear surface of the first linear polarizer 206, or on a separate sheet of transmissive substrate. The corrugated surface may comprise small metal particles, ranging in size from about 10 nm to 10000 nm, deposited on the rear surface of the first linear polarizer 206 or on a separate sheet transmissive substrate. The choice of the metal includes, for example, silver, gold, aluminum, copper, titanium, tantalum, chromium, nickel or an alloy thereof. One or more sheets of lose-packed or optically bonded transmissive substrates at least one of which has a corrugated surface can make up the diffusing element 1704. In addition, diffusing element 1704 can be optically bonded to the rear surface of the first linear polarizer 206 or/and to the front surface of the reflective polarizer 1705. The diffusing element can also be a layer of adhesive material, which bonds the first linear polarizer 206 and the reflective polarizer 1705 and comprises dispersed particles such that the haze value of the layer is in the range of about 10% to 85% in some embodiments. In other embodiments such as described herein where a diffuser is utilized, an adhesive material comprising diffusing particles may be used. This adhesive material comprising diffusing particles can diffuse the light. In certain embodiments, the diffusing adhesive has a haze value in the range of about 10% to 85% as described above. Values outside these ranges as well as different configurations both well known as well as those yet devised are possible. Other types of diffusing structures may also be used and may be located elsewhere.

With continued reference to FIG. 17A, the resistive touch panel integral 1700 (e.g., RT-TRIOLCD) further includes a first retarder layer 205 to the front side of the liquid crystal cell 210. The first retarder layer 205 may comprise a quarter wave retarder having a retardance of about $(2m+1)\lambda/4$, where m is an integer and $\lambda$ is between about 400 nm-700 nm. The first retarder layer 205 may comprise a single sheet retarder or a stack of laminated or loose sheets or a film or multiple films. The first retarder layer 205 may comprise quarter wave plates, half wave plates, or full wave plates. The rear surface of the first retarder layer 205 can be laminated to the front surface of the liquid crystal cell 210 with an index-matched pressure sensitive adhesive (PSA). Quarter wave plates with R/$\lambda$ values in the range between curves 301 and 302, as shown in FIG. 3, can be used. For example, a quarter wave plate having an R/$\lambda$ value between about 0.216 and 0.315 at a wavelength of about 520 nm may be employed. Half wave plates with R/$\lambda$ values in the range between curves 303 and 304 as shown in FIG. 3 can be used. For example, a half wave plate of R/$\lambda$ value between about 0.432 and 0.630 at a wavelength of about 520 nm may be employed. And full wave plates with R/$\lambda$ values in the range between curves 305 and 306 as shown in FIG. 3 can be used. For example, a full wave plate having R/$\lambda$ values between about 0.864 and 1.260 at a wavelength of about 520 nm may be employed.

As indicated in the arrangements 1780 and 1790 of FIGS. 17C and 17D, respectively, the slow axis 1753 of the first retarder layer 205 may be set at an angle $\theta_1$ in the range of about −(25° to 65°) or 25° to 65°, for example at about −45° or 45°, with respect to the polarization axis 1751 of the first linear polarizer 206 (as measured from the slow axis 1753 to the polarization axis 1751). It is common that a liquid crystal cell introduces a change of polarization state of an incident linearly polarized light due to the optical properties of twisted numerical liquid crystal layer sandwiched within. A most common polarization change introduced by the liquid crystal layer is 90 degree, which will be used as an example for the determination of configurations of the first circularly polarizing plate in this embodiment. Thus, as shown in the arrangement 1770 of FIG. 17B, the emitted light 1721 from the backlight module 208, passing through the first linear polarizer 206 with the direction of polarization of 1751, is altered by 90 degree to the polarization direction indicated by 1752 before entering the first retarder layer 205. Thus, the first linear polarizer 206, the liquid crystal cell 210, and the first retarder layer 205 constitute the first circularly polarizing plate 1760 with an effective configuration that is determined by the polarization direction 1752 and the slow axis 1753. While viewed from the front side of the retardation plate 205 looking towards the LCD light source, as shown in arrangement 1780 of FIG. 17C, with angle $\theta_1$ being substantially −45°, the configuration of the first circularly polarizing plate 1760 is effectively determined by the polarization direction 1752 and the slow axis 1753, which is left-handed as previously defined. In arrangement 1790 of FIG. 17D, with angle $\theta_1$ being substantially 45°, the configuration of the first polarizing plate is likewise determined as right-handed. Other values outside these ranges may be used.

Referring back to FIG. 17A, the touch panel integral 1700 (e.g. RT-TRIOLCD) also includes a STACK 1710 comprising, from the front side to the rear side, a second linear polarizer 807 having a front surface 808, a second retarder layer 805, and a resistive type touch panel 1720. The second retarder layer 805 may comprise a quarter wave retarder having a retardance of about $(2n+1)\lambda/4$, where n is an integer and $\lambda$ is between about 400 nm-700 nm. The second retarder layer may comprise a single sheet retarder or a stack of laminated or loose sheets or a film or multiple films. The second retarder layer may comprise quarter wave plates, half wave plates, or full wave plates. Quarter wave plates with R/$\lambda$ values in the range between curves 301 and 302, as shown in FIG. 3, can be used. For example, a quarter wave plate having an R/$\lambda$ value between about 0.216 and 0.315 at a wavelength of about 520 nm may be employed. Half wave plates with R/$\lambda$ values in the range between curves 303 and 304 as shown in FIG. 3 can be used. For example, a half wave plate having an R/$\lambda$ value between about 0.432 and 0.630 at a wavelength of about 520 nm may be employed. And full wave plates with R/$\lambda$ values in the range between curves 305 and 306 as shown in FIG. 3 can be used. For example, a full wave plate having an R/$\lambda$ value between about 0.864 and 1.260 at a wavelength of about 520 nm can be employed.

In certain embodiments, the rear surface of the second retarder layer 805 can be laminated to the front surface of the resistive touch panel 1720 with an index-matched pressure sensitive adhesive (PSA). Additionally, the front surface of the second retarder layer 805 can be laminated to the rear surface of the second linear polarizer 807.

The polarization axis of the second linear polarizer 807 may be set at an angle $\theta_2$ in the range of about ±(25°-65°), for example at about ±45°, to the slow axis of the second retarder layer 805 forming the second circular polarizer 1740. This second circular retarder effectively reduces or prevents the reflections from the reflective surfaces 1702, 1703, and the front surface of 205. However, as previously disclosed, the polarization axis of the second linear polarizer 807 can be conveniently set at an angle in the range of 0 to 360° regardless the orientation of the polarization axis of the first linear polarizer 205.

As discussed with reference to FIG. 9, the design or configurations of the second and first circular retarders 840 and 860 may be determined by retardance of the two retarder layers, $(2m+1)\lambda/4$ for 205 and $(2n+1)\lambda/4$ for 807, where n and m are integers and $\lambda$ is about 400 nm-700 nm. When (n+m) is 0 or an even integer, the configuration of the first and second circular retarders 860 and 840 are the same (e.g. both left-handed or both right-handed); see FIG. 9B. If (n+m) is an odd integer, the configurations of the second and first circularly polarizers 840 and 860 are to be reverse to each other; see FIG. 9C. Other values outside these ranges may also be used.

As described above, however, the liquid crystal cell 210 may introduce a 90 degree rotation of a linearly polarized light in some embodiments. The design of the structure 1700 may be adjusted to accommodate this 90° polarization change. In particular, the orientation of the polarizers and/or retarders may be altered in the first or second circular retarders, or both, in certain preferred embodiments.

With reference back to FIG. 17A, to determine the corresponding configurations of the first and second circular retarders 1760 and 1740 in the touch panel integral 1700 (e.g. RT-TRIOLCD), the retardance of the functional part(s), in this example a resistive touch panel, may also be taken into consideration. In certain embodiments, the resistive touch panel is made of thin glass sheets or isotropic plastic sheets, such as PET, PEN, TAC, PC, ARTON, etc., with minimum retardation properties, for example with retardance less than about 80 nm. In such embodiments, if there is no significant retardance in the touch panel with (n+m) being 0 or an even integer, the propagation of LCD illumination 1721 is substantially equivalent to the propagation of the light 901 in the arrangement 910 of FIG. 9B. Accordingly, the configurations of the first and second circular retarders 1760 and 1740 can be determined to be the same as each other (e.g., both right-handed or both left-handed, like in FIG. 9B). That is to say, if the first circular retarder 1760 (which includes the effects of the 90° polarization rotation introduced by the liquid crystal cell 210) is left-handed as shown in 1780 of FIG. 17C then the second circular retarder 1740 is also left-handed. For example, if the first circular retarder 1760 has an angle $\theta_1$ that is substantially −45° as shown in 1780 of FIG. 17C, the polarization axis of the second linear polarizer 807 is set such that the angle from the polarization axis to the slow axis of the second retarder layer 805 is substantially at 45°, which makes the second circular retarder 1740 left-handed. And if the first circular retarder 1760 (which includes the effects of the 90° polarization rotation introduced by the liquid crystal cell 210) is right-handed with $\theta_1$ being substantially 45° as shown in 1790 of FIG. 17D, the polarization axis of the second linear polarizer 807 is set such that the angle from the polarization axis to the slow axis of the second retarder layer 805 is substantially at −45°, which makes the second circular retarder 1740 right-handed.

On the other hand, if (n+m) is an odd integer and the retardance of the functional parts is not significant, the configurations of the first and second circular retarders 1760 and 1740 can be determined to be opposite as each other (e.g., one right-handed and one left-handed, like in FIG. 9C). That is to say, the first circular retarder 1760 is left-handed as shown in 1780 of FIG. 17C (which includes the effects of the 90° polarization rotation introduced by the liquid crystal cell 210) and the second circular retarder 1740 is right-handed. For example, if the first circular retarder 1760 has an orientation $\theta_1$ that is substantially −45° as shown in the left-handed configuration 1780 of FIG. 17C, the polarization axis of the second linear polarizer 807 is set such that the angle from the polarization axis to the slow axis of the second retarder layer 805 is substantially at −45°, which makes the second circular retarder 1740 right-handed. And if the first circular retarder 1760 is right-handed with $\theta_1$ being substantially 45° as shown in 1790 of FIG. 17D (which includes the effects of the 90° polarization rotation introduced by the liquid crystal cell 210), the polarization axis of the second linear polarizer 807 is set such that the angle from the polarization axis to the slow axis of the second retarder layer 805 is substantially at 45°, which makes the second circular retarder 1740 left-handed.

In some other embodiments, the functional parts may contain significant retardance. The retardance of the functional parts may be integrated as a part of the first retarder layer retardance, which may be adjusted to obtain an effective retardance of about $(2m+1)\lambda/4$. The configurations of the first and second circular retarders 1760 and 1740 may be determined accordingly. Thus, efficient delivery of both reflective illumination 1750 and transmissive illumination 1721 to a viewer's eyes can be achieved. Other configurations are also possible.

In various preferred embodiments, an air gap between components creates two air-material interfaces, which cause reflections due to index mismatch. These reflections may interfere and compromise the optical performances of the integral. The air-material interfaces can be eliminated by laminating the separate parts together and removing the air gap therebetween. However, adequately applying anti-reflection treatment or incorporating diffusing property on surfaces can also conveniently reduce undesirable backreflections and the resultant interference and enhance the optical properties of the integral. For example, if the rear surface of the first retarder layer 205 is laminated to the front surface of the liquid crystal cell 210 to form an integrated display module as described in FIG. 2, an anti-reflection treatment (not shown) can be disposed on the front surface of the first retarder layer 205 or the rear surface of the touch panel 1720, or the front surface of the first retarder layer 205 can include a diffusing property or structure (not shown) to curtail or prevent interference of the reflections and enhance the optical properties. The diffusing structure (not shown) can be a roughened surface or may comprise particles (as discussed in previous section) deposited on the front surface of the first retarder layer 205. In certain embodiments, the diffusing structure may comprise a laminated sheet member (not shown) with diffusing property of Haze value greater than zero. However, in other embodiments, the front surface of the first retarder layer 205 is laminated to the rear surface of the touch panel 1720. In such embodiments, an anti-reflection treatment (not shown) or diffusing structure may be disposed on at least one of the rear surface of the first retarder layer 205 and on the front surface of the liquid crystal cell 210 to achieve the equivalent optical performances. Different types of diffusing structures may be used and other configurations are possible (for example, the diffusing structure and/or anti-reflective coating may be located elsewhere).

With continued reference to FIG. 17A, in such an arrangement, the color tone and contrast of the display may be substantially maintained by reducing or minimizing the optical path of light 1721. Color tone can also be maintained by setting the transmission direction of the second linear polarizer 807 at 90 degree with respect to the polarization axis of the first linear polarizer 206 or the reflective polarizer 1705.

With further reference to FIG. 17A, the advantage of being able to deliver convenient viewing zones for viewers wearing polarized sunglasses can be achieved by further disposing a third retarder layer 1203 to the front side of the second linear polarizer 807 as described above. The third retarder layer 1203 may comprise a quarter wave retarder having a retardance of about $(2k+1)\lambda/4$, where k an integer and $\lambda$ is about 400 nm-700 nm. The third retarder layer 1203 may comprise a single sheet retarder or a stack of laminated or loose sheets or a film or multiple films. The third retarder layer 1203 may comprise quarter wave plates, half wave plates, or full wave plates. The third retarder layer 1203 converts the otherwise linearly polarized transmission 1721 to a circularly polarized transmission. The advantage of the effect can be similarly understood with reference to discussions of FIGS. 6 and 7. The front surface 808 of the second linear polarizer 807 or the front surface 1204 of the third retarder layer 1203 may comprise a highly efficient multi-layer anti-reflection coating, for example, having reflection less than about 1.5% to reduce or prevent the surface reflection 1730 and to increase or maximize the entry of light beam 140 for reflective illumination 1750. In some embodiments, the front surface 808 of the second linear polarizer 807 or the front surface 1204 of the third retarder layer 1203 can also comprise a separate transmissive substrate, e.g., glass or plastic, such as PET, PEN, TAC, PC, ARTON, with its front surface being coated with the highly efficient multi-layer anti-reflection coating, for example, providing reflection less than about 1.5%. The rear surface of the separate transmissive substrate can be bonded to the front surface of the second linear polarizer 807 or the front surface of the third retarder layer 1203 with index matching pressure sensitive adhesive (PSA). The combination of reduction or minimization of reflections, 1730 and 1731, and increase or maximization of LCD illumination, 1721 and 1750, in this embodiment, is sufficient to make the touch panel integral 1700 (e.g. RT-TRIOLCD) direct sunlight readable. Values outside the ranges provided above and other configurations may be employed (for example, the anti-reflective coating may be located elsewhere).

Several examples are presented below; however these examples are not limiting.

EXAMPLE 1

A 10.4" NLP-LCD with right-handed circular polarization output was tested and demonstrates no dark viewing zones for viewers wearing polarized sunglasses.

In comparison, an 10.4" LCD with 45 degree linear polarization output with 200 nits measured brightness, shows dark viewing zones in directions of about 1:00 and 7:00 o'clock when viewed with polarized sunglasses on. This LCD was converted to an NLP-LCD with right-handed circular polarization output by laminating a quarter wave retardation film, 65 um in thickness, with its slow axis oriented at an angle of −45 degree with respect to the linear polarization of the LCD. The brightness of the converted LCD was measured as 185 nits and showed no dark viewing zones when viewed with polarized sunglasses on.

EXAMPLE 2

A 10.4" NLP-LCD integrated with a polarized resistive touch panel shows no limitation on the orientation of the second circularly polarizing plate on the touch panel. The second right-handed circularly polarizing plates were prepared by laminating together a quarter wave plate retarder described in Example 1 and a linear polarizer having a thickness of 100 um, a transmission ~43%, and a polarization coefficient ~96%. The second right-handed circular polarizer was laminated in various orientations on a 5-wired 10.4" resistive touch panel (82% transmission) to generate low reflection polarized touch panels. The low reflection polarized touch panel with various orientation of the second linear polarization axis was then disposed on the NLP-LCD generated as described in Example 1. Brightness of light output was measured. The brightness measured and the various orientations of the polarization axis are summarized below:

| Orientation of the second linear polarization axis (degrees) | Brightness (nits) of the light output from the touch panel integrated NLP-LCD |
| --- | --- |
| 0 | 146 |
| 15 | 146 |
| 45 | 148 |
| 75 | 145 |
| 90 | 146 |
| 105 | 145 |
| 135 | 143 |
| 165 | 145 |
| 180 | 146 |

As it can be seen from the measurements, the brightness is generally constant and was not affected by the orientation of the second linear polarization axis of the polarized touch panel. The orientation of 90° showed almost full brightness when it was viewed at 6:00 o'clock of direction and showed dark viewing zones in viewing directions of 3:00 and 9:00 o'clock when viewed through polarized sunglasses. Overall, an arrangement with the second linear polarization axis being at 90° provides more convenienct viewing experiences for viewers wearing polarized sunglasses.

In various embodiments describe herein, commercial TFT LCDs, resistive touch panel, and conductive films for EMI shield, IR block, screen heater of various sizes and structures can be readily be modified and integrated to generate multifunction display structures that are viewable under direct sunlight and also providing convenient viewing zones for viewers wearing polarized sunglasses. Other advantages are also possible.

Other configurations may also be used. Additional components may be added, components may be removed, or the order of the components may be altered. Values other than those specifically recited above may be used. Other variations, both those well known in the area as well as those yet to be devised are also possible.

What is claimed is:

1. A reflective functional part integrated display comprising:
   a liquid crystal display module defining vertical and horizontal axes and having a module front surface, said liquid crystal display module comprising, from front to rear, a liquid crystal cell comprising a liquid crystal layer sandwiched between two transparent electrodes, a first linear polarizer having a first linear polarization axis, and a backlight module;
   a first retarder layer forward said liquid crystal display module, said first retarder layer having a front surface, a rear surface, a retardance of about $(2n+1)\lambda/4$, and a first slow axis, which forms an angle $\theta_1$ to said first linear polarization axis, where n is an integer and $\lambda$ is a wavelength and is between about 400 nm to 700 nm;
   a reflective functional part forward said first retarder layer, said reflective functional part having a rear surface and comprising at least one of a touch panel, an EMI shield, an infrared filter, and an LCD heater;
   a second retarder layer forward said reflective functional part, said second retarder layer having a second slow axis and a retardance of about $(2m+1)\lambda/4$, where m is an integer and $\lambda$ is a wavelength and is between about 400 nm to 700 nm;
   a second linear polarizer forward said second retarder layer, said second linear polarizer having a second linear polarization axis, which forms an angle $\theta_2$ to said second slow axis of said second retarder layer; and
   a display front surface through which light from said backlight module exits,
   wherein $\theta_2$ is between about 25° to about 65° and said second linear polarization axis is set at about 90 degree with respect to said first linear polarization axis, and
   wherein $\theta_1$ is between about −25° to about −65° when (m+n) is zero or an even integer, or $\theta_1$ is between about +25° to about +65° when (m+n) is an odd integer.

2. The display of claim 1, further comprising a partial reflector rearward of said liquid crystal layer, said partial reflector comprising reflective electrodes or a reflective sheet member.

3. The display of claim 1, wherein said display module front surface includes an anti-reflection treatment, a diffusing element, or is laminated to said rear surface of said first retarder layer.

4. The display of claim 1, wherein at least one of said first retarder layer front surface and said reflective functional part rear surface includes at least one of an anti-reflection treatment and a diffusing structure, said anti-reflection treatment comprising an AR coating or a laminated sheet member with an AR coating.

5. The display of claim 1, further comprising a third retarder layer forward said second linear polarizer, said third retarder layer comprising one or more retarders oriented such that light from said backlight module exits said display front surface as elliptical or circular polarized light.

6. The display of claim 1, wherein said display front surface comprises an anti-reflection treatment.

7. A reflective functional part integrated transflective display comprising:
   a liquid crystal display module defining vertical and horizontal axes and having a module front surface, said liquid crystal display module comprising a liquid crystal cell comprising at least a linear polarizer having a first linear polarization axis determining LCD output polzarization, and a light module;
   a first retarder layer forward said liquid crystal display module, said first retarder layer having a front surface, a rear surface, a retardance of about $(2n+1)\lambda/4$, and a first slow axis, which forms an angle $\theta_1$ to said first linear polarization axis, where n is an integer and $\lambda$ is a wavelength and is between about 400 nm to 700 nm;
   a reflective functional part forward said first retarder layer, said reflective functional part having a rear surface and comprising at least one of a touch panel, an EMI shield, an infrared filter, and an LCD heater;
   a second retarder layer forward said reflective functional part, said second retarder layer having a second slow axis and a retardance of about $(2m+1)\lambda/4$, where m is an integer and $\lambda$ is a wavelength and is between about 400 nm to 700 nm;
   a second linear polarizer forward said second retarder layer, said second linear polarizer having a second polarization axis, which forms an angle θ₂ to said second slow axis of said second retarder layer; and a display front surface through which light from the light module exits, wherein said second linear polarization axis of said second linear polarizer is set at angle of +/−45 or +/−135 degree with respect to said first linear polarization axis.

8. The display of claim 7, further comprising a partial reflector, said partial reflector comprises a diffusing structure.

9. The display of claim 8, wherein said diffusing structure comprises a corrugated diffusing surface or an adhesive layer laminating said partial reflector to said liquid crystal cell.

10. The display of claim 7, wherein said module front surface includes an anti-reflection treatment or is laminated to said rear surface of said first retarder layer.

11. The display of claim 10, wherein at least one of said first retarder layer front surface and said reflective functional part rear surface includes at least one of an anti-reflection treatment and a diffusing structure, said anti-reflection treatment comprising a multi-layer AR coating or a laminated sheet member with AR coating.

12. The display of claim 7, further comprising a third retarder layer forward said second linear polarizer, said third retarder layer comprising one or more retarders oriented such that said light exits as elliptical or circular polarized light.

13. The display of claim 7, wherein said display front surface comprises an anti-reflection treatment.

14. A reflective functional part integrated display comprising:

a liquid crystal display module having a module front surface and comprising, a liquid crystal cell, a light module, a first linear polarizer between said liquid crystal cell and said light module, said first linear polarizer having a rear surface, and a third linear polarizer forward said liquid crystal cell, said third linear polarizer having a front surface;

a first retarder layer forward said liquid crystal display module, said first retarder layer having a front surface, a retardance of about (2n+1)λ/4, and a first slow axis, where n is an integer and λ is a wavelength and is between about 400 nm to 700 nm;

a reflective functional part forward said first retarder layer, said reflective functional part having a rear surface and comprising at least one of a touch panel, an EMI shield, an infrared filter and an LCD heater;

a second retarder layer forward of said reflective functional part, said second retarder layer having a second slow axis and a retardance of about (2m+1)λ/4, where m is an integer and λ is a wavelength and is between about 400 nm to 700 nm;

a second linear polarizer forward said second retarder layer, said second linear polarizer having a second polarization axis, which forms an angle θ₂ to said second slow axis of said second retarder layer; and a display front surface through which light exits, wherein at least one of said first retarder layer front surface and said reflective functional part rear surface includes at least one of an anti-reflection treatment and a diffusing structure, said anti-reflection treatment comprising a multi-layer AR coating or a laminated sheet member with AR coating.

15. The display of claim 14, wherein said liquid crystal display module further comprises a partial reflector between said first linear polarizer and said light module.

16. The display of claim 15, wherein said partial reflector comprises a reflective polarizer.

17. The display of claim 16, wherein said partial reflector further comprises a diffusing structure.

18. The display of claim 17, wherein said diffusing structure comprises a corrugated diffusing surface or an adhesive layer laminating said first linear polarizer to said reflective polarizer.

19. The display of claim 14, wherein said first retarder layer is laminated to said liquid crystal display module front surface.

20. The display of claim 14, further comprising a third retarder layer forward said second linear polarizer, said third retarder layer comprising one or more retarders oriented such that said light exits the display front surface as elliptical or circular polarized light.

21. The display of claim 14, wherein said display front surface comprises an anti-reflection treatment.

22. The display of claim 1, further comprising at least one of a diffusing element, a reflective polarizer, or a brightness enhancement film rearward of said liquid crystal layer, said diffusing element comprising an adhesive layer, diffusing particles, or a corrugated diffusing surface, said diffusing element having a haze in the range of between about 10% to 85%.

23. The display of claim 1, wherein at least one of said first retarder layer or said second retarder layer includes an optically transmissive conductive film thereon thereby forming at least a part of said functional part.

24. The display of claim 23, further comprising at least one of a diffusing element, a reflective polarizer, or a brightness enhancement film rearward of said liquid crystal layer, said diffusing element comprising an adhesive layer, diffusing particles, or a corrugated diffusing surface, said diffusing element having a haze in the range of between about 10% to 85%.

25. The display of claim 1, wherein said liquid crystal display module further comprises a third linear polarizer forward said liquid crystal cell.

26. The display of claim 25, further comprising at least one of a diffusing element, a reflective polarizer, or a brightness enhancement film rearward of said liquid crystal layer, said diffusing element comprising an adhesive layer, diffusing particles, or a corrugated diffusing surface, said diffusing element having a haze in the range of between about 10% to 85%.

27. The display of claim 1, wherein said second linear polarization axis is set at about one of the following angles: 0, 15, 45, 75, 90, 105, 135, 165, and 180 degree with respect to said horizontal axis.

28. The display of claim 27, wherein at least one of said first retarder layer or said second retarder layer includes an optically transmissive conductive film thereon thereby forming at least a part of said functional part.

29. The display of claim 27, wherein said liquid crystal display module further comprises a third linear polarizer forward said liquid crystal cell.

30. A reflective functional part integrated display comprising:

a liquid crystal display module defining vertical and horizontal axes and having a module front surface, said liquid crystal display module comprises, from front to rear, a liquid crystal cell comprising a liquid crystal layer sandwiched between two transparent electrodes, a first linear polarizer having a first linear polarization axis, and a backlight module;

a first retarder layer forward said liquid crystal display module, said first retarder layer having a front surface, a rear surface, a retardance of about (2n+1)λ/4, and a first slow axis, which forms an angle $\theta_1$ to said first linear polarization axis, where n is an integer and $\lambda$ is a wavelength and is between about 400 nm to 700 nm;

a reflective functional part forward said first retarder layer, said reflective functional part having a rear surface and comprising at least one of a touch panel, an EMI shield, an infrared filter, and an LCD heater;

a second retarder layer forward said reflective functional part, said second retarder layer having a second slow axis and a retardance of about $(2m+1)\lambda/4$, where m is an integer and $\lambda$ is a wavelength and is between about 400 nm to 700 nm;

a second linear polarizer forward said second retarder layer, said second linear polarizer having a second linear polarization axis, which forms an angle $\theta_2$ to said second slow axis of said second retarder layer; and a display front surface through which light from said backlight module exits, wherein $\theta_2$ is between about $-25°$ to about $-65°$ and said second linear polarization axis is set at about 90 degree with respect to said first linear polarization axis, and wherein $\theta_1$ is between about $+25°$ to about $+65°$ when (m+n) is zero or an even integer, or $\theta_1$ is between about $-25°$ to about $-65°$ when (m+n) is an odd integer.

31. The display of claim 30, further comprising at least one of a diffusing element, a reflective polarizer, or a brightness enhancement film rearward of said liquid crystal layer, said diffusing element comprising an adhesive layer, diffusing particles, or a corrugated diffusing surface, said diffusing element having a haze in the range of between about 10% to 85%.

32. The display of claim 30, wherein at least one of said first retarder layer or said second retarder layer includes an optically transmissive conductive film thereon thereby forming at least a part of said functional part.

33. The display of claim 32, further comprising at least one of a diffusing element, a reflective polarizer, or a brightness enhancement film rearward of said liquid crystal layer, said diffusing element comprising an adhesive layer, diffusing particles, or a corrugated diffusing surface, said diffusing element having a haze in the range of between about 10% to 85%.

34. The display of claim 30, wherein said liquid crystal display module further comprises a third linear polarizer forward said liquid crystal cell.

35. The display of claim 34, further comprising at least one of a diffusing element, a reflective polarizer, or a brightness enhancement film rearward of said liquid crystal layer, said diffusing element comprising an adhesive layer, diffusing particles, or a corrugated diffusing surface, said diffusing element having a haze in the range of between about 10% to 85%.

36. The display of claim 30, wherein said second linear polarization axis is set at about one of the following angles: 0, 15, 45, 75, 90, 105, 135, 165, and 180 degree with respect to said horizontal axis.

37. The display of claim 36, wherein at least one of said first retarder layer and said second retarder layer includes an optically transmissive conductive film thereon thereby forming at least a part of said functional part.

38. The display of claim 36, wherein said liquid crystal display module further comprises a third linear polarizer forward said liquid crystal cell.

39. The display of claim 6, wherein said anti-reflection treatment of said display front surface is on a glass substrate.

40. The display of claim 13, wherein said anti-reflection treatment of said display front surface is on a glass substrate.

41. The display of claim 21, wherein said anti-reflection treatment of said display front surface is on a glass substrate.

42. The display of claim 30, wherein said display front surface comprises an anti-reflective treatment and said anti-reflection treatment of said display front surface is on a glass substrate.

* * * * *